United States Patent
Schreiner et al.

(10) Patent No.: US 12,482,244 B2
(45) Date of Patent: Nov. 25, 2025

(54) ACTIVE LEARNING MANAGEMENT SYSTEM FOR AUTOMATED INSPECTION SYSTEMS

(71) Applicant: 3M INNOVATIVE PROPERTIES COMPANY, St. Paul, MN (US)

(72) Inventors: Samuel S. Schreiner, New Brighton, MN (US); Steven P. Floeder, Shoreview, MN (US); Jeffrey P. Adolf, Rochester, MN (US); Carl J. Skeps, Lakeville, MN (US); Shane T. Van Kampen, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 335 days.

(21) Appl. No.: 18/269,657

(22) PCT Filed: Dec. 23, 2021

(86) PCT No.: PCT/IB2021/062274
§ 371 (c)(1),
(2) Date: Jun. 26, 2023

(87) PCT Pub. No.: WO2022/144733
PCT Pub. Date: Jul. 7, 2022

(65) Prior Publication Data
US 2024/0071059 A1     Feb. 29, 2024

Related U.S. Application Data

(60) Provisional application No. 63/131,166, filed on Dec. 28, 2020.

(51) Int. Cl.
*G06V 10/778* (2022.01)
*G06V 10/77* (2022.01)

(52) U.S. Cl.
CPC ........ *G06V 10/778* (2022.01); *G06V 10/7715* (2022.01)

(58) Field of Classification Search
USPC .................. 382/141–152, 155, 159, 199
See application file for complete search history.

(56) References Cited

U.S. PATENT DOCUMENTS

| 7,542,821 B2 | 6/2009 | Floeder et al. |
| 9,002,072 B2* | 4/2015 | Tarnowski ........... G06V 10/945 250/559.01 |

(Continued)

FOREIGN PATENT DOCUMENTS

WO    2022144722 A1    7/2022

OTHER PUBLICATIONS

Zaghdoudi et al., Binary Gabor pattern (BGP) descriptors and principle component andalys (PCA) for steel surface defects classification, IEEE 978-1-6654-2231-4/20, DOI: 10.1109/ICAASE51408.2020.9380108 (Year: 2020).*

(Continued)

*Primary Examiner* — Ishrat I Sherali
(74) *Attorney, Agent, or Firm* — Sriram Srinivasan

(57) ABSTRACT

An example method for selecting product images for training a machine-learning model includes obtaining product images to include in an image population; receiving an indication of an image selection strategy for determining if a product image is to be included in a set of images of interest; determining image transforms based on configuration data for the indicated image selection strategy, wherein the image transforms perform image manipulation operations to obtain transformed image data for each of the product images in the image population; selecting a subset of images from the image population for inclusion in the set of images of interest based on the indicated image selection (Continued)

strategy and the transformed image data; determining one or more descriptive labels and applying the one or more descriptive labels to the respective sets of images; and training an inspection model for a product inspection system based on the labeled images.

19 Claims, 19 Drawing Sheets

(56) References Cited

U.S. PATENT DOCUMENTS

| | | | |
|---|---|---|---|
| 10,262,272 B2 | 4/2019 | Chickering et al. | |
| 10,325,224 B1 | 6/2019 | Erenrich et al. | |
| 10,719,301 B1 | 7/2020 | Dasgupta et al. | |
| 11,669,746 B2* | 6/2023 | Deng | G06F 18/22 |
| | | | 706/12 |
| 11,836,909 B2* | 12/2023 | Ganju | G06V 10/7788 |
| 2007/0011127 A1 | 1/2007 | Yamashita et al. | |
| 2013/0322733 A1* | 12/2013 | Tarnowski | G06F 18/40 |
| | | | 382/141 |
| 2018/0032900 A1 | 2/2018 | Chowdhury et al. | |
| 2018/0189610 A1 | 7/2018 | Kandemir et al. | |
| 2019/0138786 A1* | 5/2019 | Trenholm | G06F 18/241 |
| 2019/0318261 A1 | 10/2019 | Deng et al. | |
| 2023/0252295 A1* | 8/2023 | Li | G06N 3/08 |
| | | | 706/25 |
| 2023/0409016 A1* | 12/2023 | Ganju | G06F 18/2337 |

OTHER PUBLICATIONS

Richter et al., Modern Architecture for Deep learning based Automatic Optical Inspection, IEEE 978-1-7281-2607-4/19, DOI: 10.1109/COMPSAC.2019.10197 (Year: 2019).*

International Search Report for PCT International Application No. PCT/IB2021/062274, mailed on Apr. 4, 2022, 3 pages.

Sculley, "Web-scale k-means clustering", WWW '10: Proceedings of the 19th international conference on World Wide Web, Apr. 2010, pp. 1177-1178.

* cited by examiner

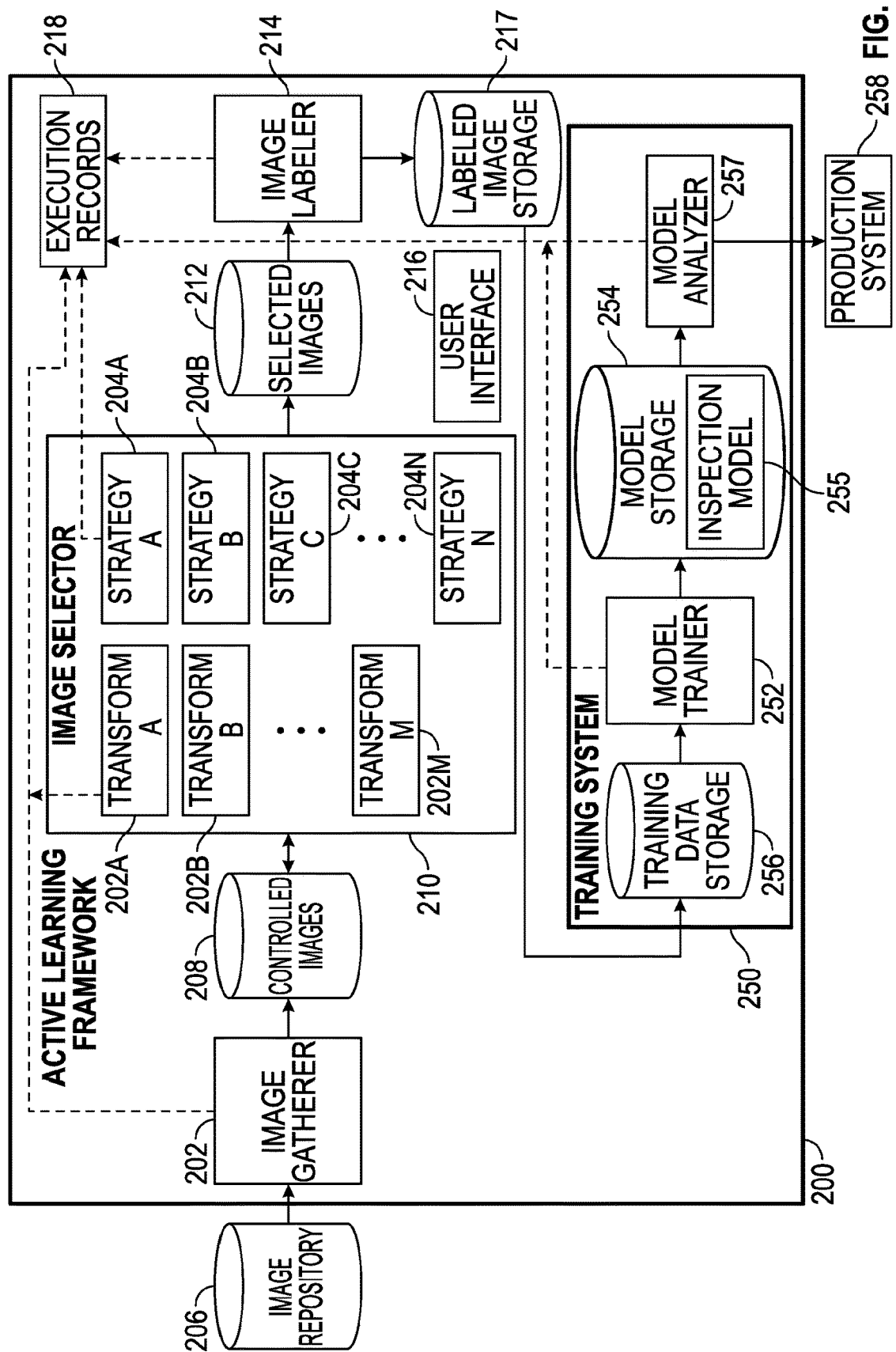

Transformer Options

Transformer Configuration: The First Transformer
Number of components to keep
10

Transformer Configuration: The Second Independent Transformer
Number of components to keep Example Model 1
Example Model 2

Strategy Options

Strategy Configuration: An Example Strategy
Specify the number of images to be selected*
100

Select an option from the list above, which will be passed to the python script
Selection Option 1 ▽

 This illustrates how a checkbox is configured and displayed.

Example Addable Group (Group 1) [x]
Specify the ID of the label for defective images.*
0
 Whether the label is a defect or not

Example Addable Group (Group 2) [x]
Specify the ID of the label for defective images.*
1
☐ Whether the label is a defect or not

[+ Add New Set]

Comments

Comments/Notes

[< Back]    [Launch Strategy Execution >]

FIG. 5

≡ SAL (Streamlined Active Learning)　　　　　　　　　　　　　　　　　　　　　　　　AIM

🏠 Home　　　　　◉ Create or Load a Project　　　　　　　　　　　　　　　　⊘ Loaded Project Details —900

📋 Project Dashboard

🖼 Image Population　　　　　　　　　　　　　　　🔍 Filter the project table below

‹› Strategies

🏷 Labeler　　　┌ + Create New Project ┐

⚙ Recipe Generation

| Name | Creation Date ▼ | Description | Created By | Population Size | Locked By | Action |
|---|---|---|---|---|---|---|
| MNIST Project | 10/15/20 | This is a project testing multi-class classification on MNIST digit images | John Doe | 10,000 | 🔒 John Doe | ⤓ Close |
| Another Project | 10/15/20 | Another project, used for display | John Doe | 4,063 | 🔒 N/A | ☑ Open |
| Defect Classification | 10/14/20 | Classifying defects | John Doe | 23,235 | 🔒 N/A | ☑ Open |
| Anomaly Detection | 10/14/20 | Checking for anomalies | John Doe | 0 | 🔒 Jane Doe | ⤓ Close |
| Yet Another Project | 09/24/20 | Yet another project for display | John Doe | 76 | 🔒 N/A | ☑ Open |
| One More Project | 09/04/20 | This is a good project | John Doe | 4,140 | 🔒 N/A | ☑ Open |
| My Project | 08/24/20 | This is my project | John Doe | 4,063 | 🔒 N/A | ☑ Open |
| Product Trial Run | 08/20/20 | Giving the product a trial run | John Doe | 437 | 🔒 N/A | ☑ Open |
| Product X | 07/23/20 | Project for detecting defects in product X | John Doe | 4,140 | 🔒 N/A | ☑ Open |
| Product Y | 07/06/20 | Detecting defects in product Y | John Doe | 4,063 | 🔒 N/A | ☑ Open |
| Product Z | 06/28/20 | Analyzing product z for defective parts | John Doe | 408 | 🔒 N/A | ☑ Open |

⎬—902 v1.2.3　　　　　　　　　　　　　　　　　　　　　　　　　　　　　　　　　　3M Science. Applied to Life.™

Current Project: MNIST Project

FIG. 9A

≡ SAL (Streamlined Active Learning)     AIM — 904

Image Population for Project: MNIST Recipe Gen Test

- Home
- Project Dashboard
- Image Population
- <> Strategies
- Labeler
- Recipe Generation

Image Population Overview

Total Number of Images: 10000

Population Preview — 908

[Add Images To Population]

[grid of handwritten digit thumbnails: 0s, 1s, and 2s]

Items per page: 25 ▼    1 - 25 of 10000   |<   <   >   >|

< Back to Project Dashboard

Population Manager Execution Records — 906

📄 10/15/20 - Network Directory Population Manager *[Id: 2]* ∧

Created By: Jane Doe on 10/15/20, 8:54 AM
Task Status (Id: 209)
- Operation State: Completed
- For more details, <u>click here</u>

Setup Details:
- Comments:
- FileExtensions: *.png *.jpg *.bmp *.gif *.tif
- FileNamePattern:
- FolderPath: \\pathtoimage-files
- PopulationManagerId: 1
- Recursive: true Extended Context:
- Added Image Count: 9900
- Completion: 10/15/2020 8:56 AM
- Rejected Image Count: 100
- Total Async Processing Time: 2.217 min 📄 10/15/20 - Network Directory Population Manager *[Id: 1]* ∨

Current Project: MNIST Project     [Identify Useful Images >]

v1.2.3     3M Science. Applied to Life.™

SAL (Streamlined Active Learning) — AIM — 910

- Home
- Project Dashboard
- Image Population
- Strategies
- Labeler
- Recipe Generation

Strategy Execution Records    + Execute New Strategy — 912
View the status of Image Selection Strategy execution records, which may be complete, queued, or in-progress.

- 10/28/20 - Images from ML Model [Id: 5]  ⌃

Created By: Jane Doe on 10/28/20, 1:20 PM
  Task Status (Id: 218)
  - Operation State: InProgress
  - Progress: 19.44%
  - For more details, click here Setup Details:
  - ExecutorConfiguration:
    - SingleThreshold: 3
  - ExecutorId: 4
  - TransformerConfigurations:
    - [Id:3] Workspace: MNIST 6 model
    - [Id:3] WorkspaceFullPath: null Extended Context:
  - Comments:
    John Doe

- 10/28/20 - Images from ML Model [Id: 4]  ⌄
- 10/28/20 - Uniform Sampling (Every Nth Image) [Id: 3]  ⌄
- 10/28/20 - Novel Images [Id: 2]  ⌄
- 10/28/20 - Outlier Images [Id: 1]  ⌄

Metrics — 914
Number of Useful Images: 173

Transformer Execution Records
View Image Transformer Execution runs, which may be complete, queued, or in-progress. Note: transformer runs may not be 1-to-1 with strategy runs, since SAL will re-use historical transformer runs where possible.

- 10/28/20 - PCA Transformer [Id: 4]  ⌄

- 10/28/20 - PCA Transformer [Id: 3]  ⌃

Created By: Jane Doe on 10/28/20, 1:18 PM
  Task Status (Id: 214)
  - Operation State: Completed
  - For more details, click here Setup Details:
  - AssemblyQualifiedName: MMM.AIM.SAL.Transformers.AIMSALPythonTransformerFactory,SALSelectionStrategyExecutor
  - EntryPoint: run_main
  - GitCommit: 16a037ec96d0942a59dbcda6222c42b53c7d8ca0
  - NumberComponents: 10
  - ScriptName: transformers.PCATransformer.py Extended Context:
  - Transformed Image Count: 4063
  - Total Async Processing Time: 10 sec

- 10/15/20 - Images Feature Transformer [Id: 2]  ⌄
- 10/15/20 - ML Model Transformer [Id: 1]  ⌄ v1.2.3

Current Project: My Project

3M Science. Applied to Life.™

ACTIVE LEARNING MANAGEMENT SYSTEM FOR AUTOMATED INSPECTION SYSTEMS

BACKGROUND

Inspection systems for the analysis of moving web materials have proven critical to modern manufacturing operations. Industries as varied as metal fabrication, paper, nonwovens, and films rely on these inspection systems for both product certification and online process monitoring. Inspection systems typically utilize data analysis processes that attempt to discriminate good product from defective product. Some inspection systems utilize machine learning models that have been trained to identify defects or anomalies in web materials, sheet parts, and other piece parts from images captured during the manufacturing operations. Training such machine learning models can require large numbers of images representing various types of defects and anomalies, along with images that do not show defects or anomalies.

SUMMARY

In general, this disclosure describes techniques for generating machine learning models for inspection systems. More specifically, this disclosure describes example techniques that facilitate managing facets of an active learning process to generate machine learning models for automated inspection systems quickly and efficiently.

In order to use product images for training of a machine learning model, the images must typically be labeled by an expert familiar with the subject of the images. Given a pre-existing inspection system, it is often easy to gain access to a large number of unlabeled images capturing nominal and defective products. However, labeling these images can be cost-prohibitive, such that only a subset can be labeled. In fact, the sheer volume of images available can be a hindrance because it requires someone (or something) to decide which subset of images should be labeled for use in training a machine learning model. If the subset is not selected carefully, it can lead to an unbalanced model that does not perform well in production.

Advances in the field of deep learning have enabled machine learning models to be trained using relatively few images. However, the challenge of selecting a subset of images to be labeled by an expert and used for machine learning training can still present a substantial hurdle to the development and deployment of machine learning models into production inspection systems. The techniques described herein can be embodied in a system that manages image data and employs active learning algorithms. Active learning is a class of semi-supervised machine learning in which algorithms and human intuition are used in tandem to select and label training data. Active learning aims to achieve high model accuracy using as few labeled data, in this case specifically images, as possible.

As described herein, an active learning framework includes techniques for defining and managing a workflow of active learning tasks for labeling images and using the labeled images to train inspection models for use in inspection systems.

In the various examples set forth herein, an active learning framework is described that can facilitate and enable execution of workflows for active learning such that the workflows efficiently select images of interest from a large population of product images, some of which show defects in products. The active learning framework may be configured by a user to execute various image selection strategies for selecting images of interest from the large population of product images. Further, the strategies may be configured by the user to perform particular transformations on the product images prior to their processing by an image selection strategy. An image selection strategy can be operations and/or rules that are performed by processing circuitry that select images from an image population according to the selection strategy. The active learning framework stores metadata throughout a workflow process. Such metadata can include the source of a product image, a history of various the transformations applied to a product image, a selection strategy that resulted in selection of a product image as an image of interest etc. The metadata may be used to avoid duplication of effort. For example, if one strategy utilizes a particular image transformation, a second strategy that uses the same transformation need not apply it to the same set of images, but rather can retrieve the previously transformed image data from storage.

The techniques of this disclosure may provide at least one technical advantage. For example, the techniques can reduce the time and effort needed to create inspection models that improve defect detection capability of inspection systems for production lines. Such inspection models can improve yield, reduce waste, and enhance process understanding. A practical application of the techniques described herein is an active learning framework that can quickly and efficiently select images of interest from a large population of images. The images of interest can be used to train an inspection model that can be used by an inspection system to identify defects in products on a production line.

In one example, this disclosure describes a method for selecting product images for training a machine-learning model to inspect images of a product includes obtaining, by an image gatherer of an active learning framework from an image repository, product images to include in an image population; receiving, by an image selector, an indication of an image selection strategy from a plurality of image selection strategies, each of the image selection strategies defining selection operations for determining if a product image is to be included in a set of images of interest; instantiating, by the image selector, a selection strategy task process corresponding to the image selection strategy, the selection strategy task process configured to perform the selection operations of the selection strategy; determining, by the selection strategy task process, one or more image transforms from a plurality of image transforms based on configuration data for the indicated image selection strategy; in response to determining that one or more of the product images in the image population have not been previously transformed according to the one or more image transforms, instantiating one or more image transform task processes corresponding to the one or more image transforms, wherein the one or more image transform task processes are configured to perform image manipulation operations to obtain the transformed image data for each of the one or more of the product images in the image population; selecting, by the selection strategy task process, a subset of images from the image population for inclusion in the set of images of interest based on the selection operations for the indicated image selection strategy and the transformed image data; determining, by an image labeler, an indication of one or more descriptive labels and applying the one or more descriptive labels to the respective sets of images; and training an inspection model for a product inspection system based on the set of images of interest and corresponding labels of the set of images of interest.

In another example, this disclosure describes an active learning management system for selecting product images for training a machine-learning model to inspect images of a product, the active learning management system includes a memory; and processing circuitry configured to: obtain, from an image repository, product images to include in an image population; receive an indication of an image selection strategy from a plurality of image selection strategies, each of the image selection strategies defining selection operations for determining if a product image is to be included in a set of images of interest; instantiate a selection strategy task process corresponding to the image selection strategy, the selection strategy task process configured to perform the selection operations of the selection strategy; determine, by the selection strategy task process, one or more image transforms from a plurality of image transforms based on configuration data for the indicated image selection strategy; in response to a determination that one or more of the product images in the image population have not been previously transformed according to the one or more image transforms, instantiate one or more image transform task processes corresponding to the one or more image transforms, wherein the one or more image transform task processes are configured to perform image manipulation operations to obtain the transformed image data for each of the one or more of the product images in the image population; select, by the selection strategy task process, a subset of images from the image population for inclusion in the set of images of interest based on the selection operations for the indicated image selection strategy and the transformed image data; determine an indication of one or more descriptive labels and apply the one or more descriptive labels to the respective sets of images; and train an inspection model for a product inspection system based on the set of images of interest and corresponding labels of the set of images of interest.

In another example, this disclosure describes an inspection system for inspecting products used on a production line, the inspection system includes one or more image capture devices configured to capture a product image of a product; a memory; and first processing circuitry configured to: receive the product image; pass the product images through a machine learning model, the machine learning model trained using a set of images of interest, the set of images of interest created by second processing circuitry configured to: obtain, from an image repository, product images to include in an image population; receive an indication of an image selection strategy from a plurality of image selection strategies, each of the image selection strategies defining selection operations for determining if a product image is to be included in a set of images of interest; instantiate a selection strategy task process corresponding to the image selection strategy, the selection strategy task process configured to perform the selection operations of the selection strategy; determine, by the selection strategy task process, one or more image transforms from a plurality of image transforms based on configuration data for the indicated image selection strategy; instantiate one or more image transform task processes corresponding to the one or more image transforms, wherein the one or more image transform task processes are configured to perform image manipulation operations to obtain the transformed image data for each of the one or more of the product images in the image population.

The details of at least one example of the disclosure are set forth in the accompanying drawings and the description below. Other features, objects, and advantages of the disclosure will be apparent from the description and drawings, and from the claims.

BRIEF DESCRIPTION OF DRAWINGS

FIG. 2B is a block diagram illustrating an example embodiment of an active learning framework cooperating with a training system, in accordance with at least one example technique described in this disclosure.

FIG. 5 illustrates an example form generated according to the strategy and transform configurations of FIG. 4.

FIGS. 9A-9E are block diagrams illustrating various aspects of an example user interface for controlling active learning tasks and other tasks in accordance with at least one example technique described in this disclosure.

DETAILED DESCRIPTION

Systems and techniques are described for selecting images of both nominal and defective products that can be used to train an inspection model to automatically identify defects in a product. An active learning framework can use the techniques to apply user configurable image selection strategies to automatically select images of interest that can be used to train the inspection model. The active learning framework can facilitate the efficient iterative development of an inspection model for an inspection system of a process line.

Figure 1:
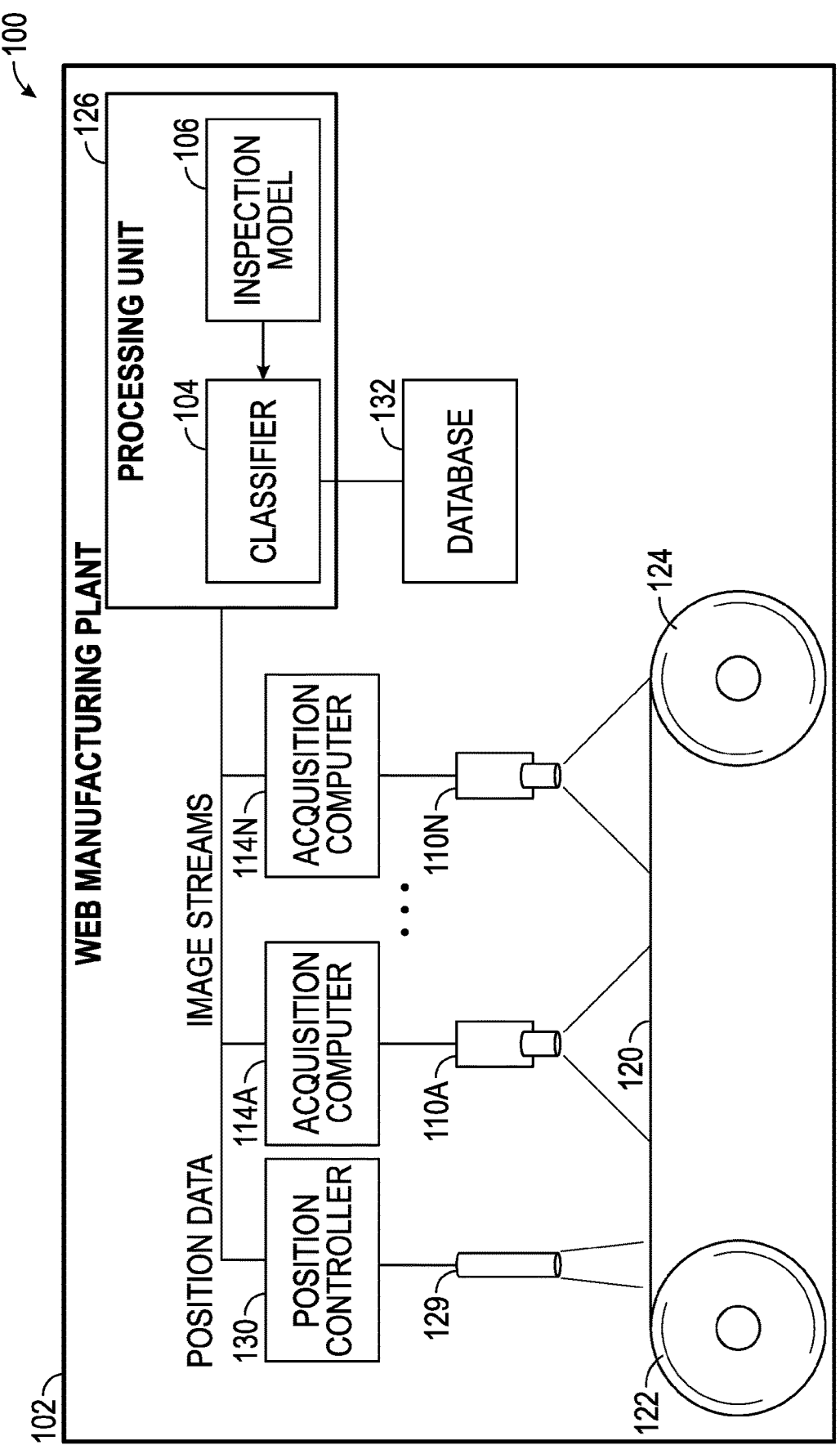
FIG. 1 is a block diagram illustrating an example embodiment of a process line of a web manufacturing plant that uses inspection recipes generated according to at least one example technique described in this disclosure.

FIG. 1 is a block diagram illustrating an example embodiment of a process line of a web manufacturing plant 102 that uses inspection models generated according to at least one example technique described in this disclosure. In the example of FIG. 1, a segment of a web 120 is positioned between two support rollers 122, 124. Image acquisition devices 110A-110N ("image acquisition devices 110") are positioned in proximity to the continuously moving web 120. Image acquisition devices 110 can scan sequential portions of the continuously moving web 120 to obtain image data. Acquisition computers 114 collect image data from image acquisition devices 110 and transmit the image data to processing unit 126 for analysis.

Image acquisition devices 110 may be conventional imaging devices that are capable of reading a sequential portion of the moving web 120 and providing output in the form of a digital data stream. As shown in FIG. 1, image acquisition devices 110 may be cameras that directly provide a digital data stream or an analog camera with an additional analog to digital converter. Other sensors, such as, for example, laser scanners may be utilized as the imaging acquisition device. Examples of devices suitable for acquiring the image include linescan cameras such as models from Dalsa (Waterloo, Ontario, Canada), or E2V (Chelmsford, United Kingdom).

The image may be optionally acquired through the utilization of optic assemblies that assist in the procurement of the image. The assemblies may be either part of a camera or may be separate from the camera. Optic assemblies utilize reflected light, transmitted light, or transflected light during the imaging process. Reflected light, for example, is often suitable for the detection of defects caused by web surface deformations, such as surface scratches.

Position controller 130 controls position mark reader 129 to collect roll and position information from web 120. For example, position mark controller may include one or more photo-optic sensors for reading position marks such as bar codes, fiducial marks or other position indicia from web 120. In addition, position controller 130 may receive position signals from one or more high-precision encoders engaged with web 120 and/or rollers 122, 124. Based on the position signals, position controller 130 determines position information for each detected position mark. For example, position controller 130 may produce position information locating each detected position mark within a coordinate system applied to the process line. Alternatively, processing unit 126 may place each of the detected position marks within the coordinate system based on the position data received from position controller 130. In this case, the position data provided by position controller 130 may represent distances between each position mark in a dimension along the length of web 120. In either case, position controller 130 communicates the roll and position information to processing unit 126.

Processing unit 126 processes image streams from acquisition computers 114. Classifier 104 can receive the image streams and utilize inspection model 106 to classify portions of web 120 as being defective, non-defective, or other classification. In some aspects, inspection model 106 may be a machine learning model, a decision tree, or an inspection recipe. Classifier 104 can execute the operations based on inspection model 106 with respect to an image of the image streams in order to classify the portion of the web 120 that corresponds to the image. In some aspects, the operations can comprise rules that are applied to the image data. For example, a set of one or more rules may be applied to the image data to determine if a defect is present in web 120, and to classify the portion of the web 120 that corresponds to the defect accordingly. Each of the rules can define an action and at least one condition having criteria for determining whether the action is to be executed. As an example, the condition may define filter criteria for filtering images that do not meet the filter criteria. The filter criteria can be expressed in terms of attributes of the image data obtained via image data analysis (e.g., defect_area>621). The action can be passing the image data to a next rule or rules, or applying a classification to the data. In other aspects, image data can be provided to a convolutional neural network (CNN) which utilizes multiple layers of mathematical operations to produce a final classification with respect to the image data (e.g., defective, OK, etc.). Techniques for managing workflows used to generate inspection models (e.g., inspection model 106) using an active-learning process are further described below.

Based the position data produced by position controller 130, processing unit 126 determines the spatial position of each detected defect within the coordinate system of the process line. That is, based on the position data from position controller 130, processing unit 126 determines the x-y and possibly z position for each anomaly within the coordinate system used by the current process line. For example, a coordinate system may be defined such that the x dimension represents a distance across web 120, ay dimension represents a distance along a length of the web, and the z dimension represents a height of the web, which may be based on the number of coatings, materials or other layers previously applied to the web. Moreover, an origin for the x, y, z coordinate system may be defined at a physical location within the process line and is typically associated with an initial feed placement of the web 120. The coordinate system defined for the current process line may not be (and is typically not) the same coordinate system for any previous or subsequent processes applied to web 120.

Processing unit 126 records in database 132 the spatial location of each detected defect with respect to the coordinate system of the process line, this information being referred to herein as local defect information. Other process variables may be stored in database 132 as well. That is, processing unit 126 stores the local defect information for web 120, including roll information for the web 120 and position information for each detected defect, within database 132. The local defect information generated for the current process line may be subsequently spatially registered with local defect information generated by the other process lines for the same web. Further details regarding registration of local defect information may be found in U.S. Pat. No. 7,542,821 entitled "MULTI-UNIT PROCESS SPATIAL SYNCHRONIZATION OF IMAGE INSPECTION SYSTEMS," filed Jul. 26, 2007 which is hereby incorporated by reference herein.

In some aspects, image data from the image data stream may be stored in database 132. The stored image data may be provided to an active-learning framework for use in training a machine learning model for an inspection system as will be described below.

Figure 2A:
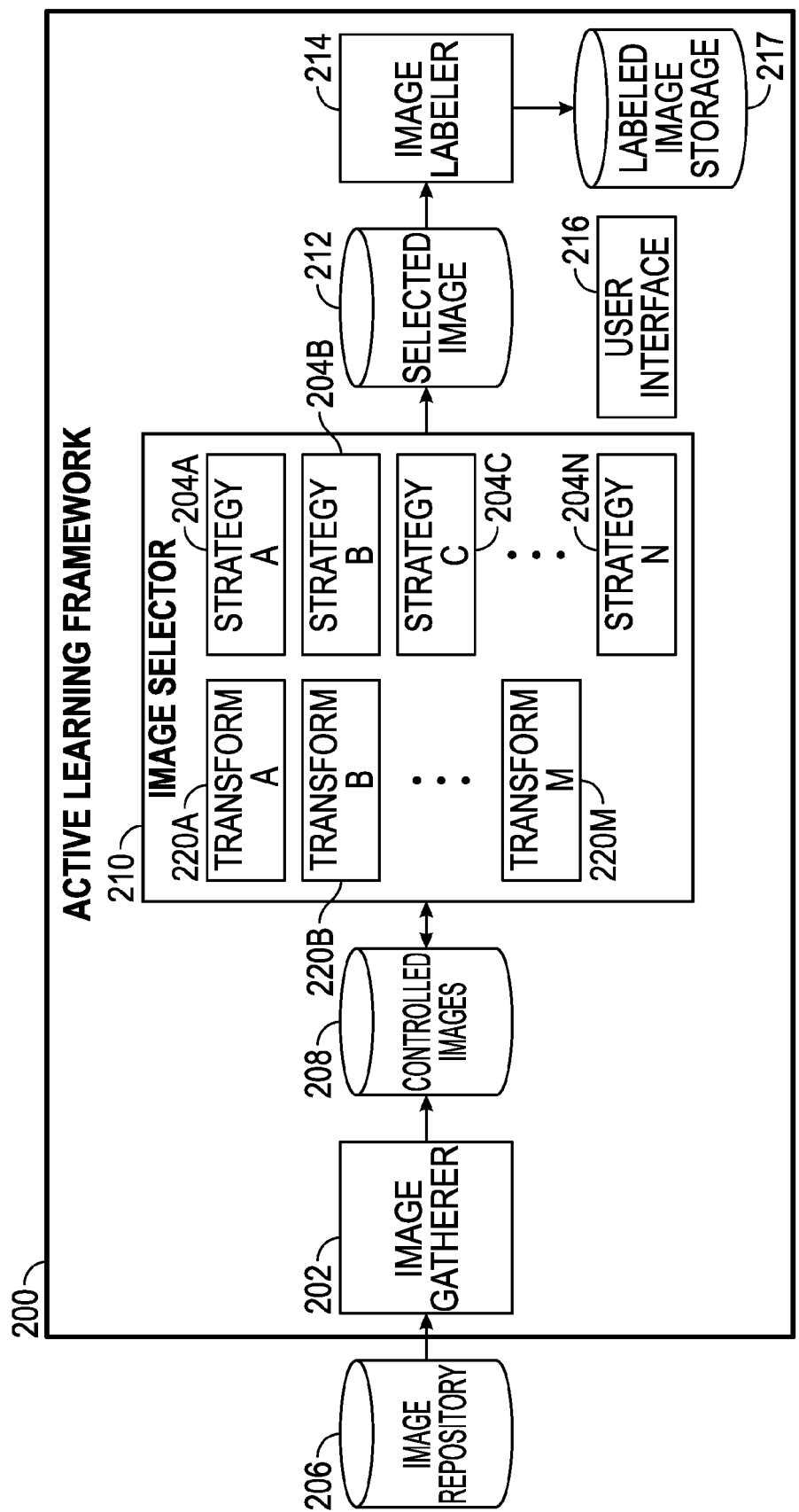
FIG. 2A is a block diagram illustrating an example embodiment of an active learning framework, in accordance with at least one example technique described in this disclosure.

FIG. 2A is a block diagram illustrating an example embodiment of an active learning framework 200, in accordance with at least one example technique described in this disclosure. In some aspects, active learning framework 200 includes image gatherer 202, image selector 210, and image labeler 214.

Image gatherer 202 can import images from an external source of images such as image repository 206 and can store the imported images in a controlled container such as controlled images 208. Controlled images 208 may be a set of images that are to be used for a given project within the active learning framework 200. Controlled images 208 may also be referred to as an "image population 208." The use of a controlled set of images in controlled images 208 can protect the active learning framework 200 from changes that may occur within image repository 206 such as images being deleted after a certain amount of time. Image gatherer 202 can associate metadata with controlled images 208 to identify the source of the image, i.e., the source of external images within image repository 206.

Image selector 210 can implement one or more selection strategies 204 to identify the images from controlled images 208 that are likely to have the highest value in being labeled. A selection strategy may be configured to transform an image prior to applying the selection strategy. In some aspects, a selection strategy 204 may be associated with zero or more of transform A 220A—transform M 220M (generically referred to as "transform 220"). A transform 220 can transform an image in various ways and store the transformed image into controlled images 208. The transformed image data can be stored alongside or in association with the original untransformed image as received by image gatherer 202 from image repository 206. Transform 220 may store an indication of the transformation applied to an image as metadata for the transformed image.

Various types of transformations are possible. For example, a transform 220 may reduce a size of an image or transform the image to different dimensions. Other transformations that may be performed include binarization, conversion to gray scale, applying thresholds to intensity, calculating summary statistics of the image pixel values, etc. In some aspects, a transform 220 can be a unity transform. In this example, transform 220 simply passes the entire image pixel data to a selection strategy 204.

In some aspects, a transform 220 can provide image statistics to a selection strategy 204. In this example, transform 220 can calculate statistics using the image pixel data. Transform 220 may determine subregions of the pixel data and calculate statistics regarding the subregions. For example, transform 220 may identify one or more regions in which the pixels have the same value after the image is binarized using a predetermined or configurable threshold value. Transform 220 may create subregions that satisfy one or more constraints. For example, the constraint may be a minimum size constraint. In some aspects, the subregions may be referred to as "blobs." The statistics may be passed to a selection strategy 204.

In some aspects, image transformations are performed in the context of a larger set of images and may rely on relative calculations between images. A transform 220 can include a parameter that indicates if it relies on a larger image set, and this parameter can govern how the transform 220 is executed within the system. For example, a transform may perform principal component analysis (PCA). In this example, transform 220 resizes all images to the same size M×N where M and N are an average size for all of the images. Transform 220 can flatten the resized images into a single-dimension vector (M*N×1). Transform 220 can then apply PCA to all image vectors to reduce their dimensionality from M*N to D, where D<M*N. In some aspects, D has a default value often (10). An underlying assumption behind using PCA to reduce image dimensionality is that similar-looking images reside close to one another in the reduced (D-dimensional) space.

In some aspects, transform 220 can be an autoencoder (AE). In this example, transform 220 resizes all images to the same size M×N where M and N are an average size for all of the images. Transform 220 trains a convolutional encoder on the image population. Transform 220 can extract the latent feature layer and use this lower-dimensional vector as the image transformation passed to a selection strategy 204.

The above-described transforms are examples that may be used in various implementations. Other transforms may be used and are within the scope of the inventive techniques described herein.

Image selector 210 can execute a selection strategy 204 with respect to the original image, the transformed version of the original image (if present), or both. In some aspects, a selection strategy 204 can be an active learning algorithm. As noted above, a significant challenge in many machine learning environments is the sheer number of images available for training. It may be prohibitive in terms of cost and time to pay experts to label the entire image set in controlled images 208. Some or all of selection strategies 204 can address this technical problem by automatically identifying images from controlled images 208 to be used for training a machine learning model. For example, image selector 210 can utilize one or more selection strategies 204 that implement active learning algorithms to identify the images from controlled images 208 that have the highest value in being labeled; that is, the images that may likely provide the largest benefit to a machine learning model's performance when used in a production environment.

Image selector 210 can implement many different types of selection strategies 204. A selection strategy may be selected based on the phase of an active learning workflow. As an example, an active learning workflow may have three phases, an early phase, an iterative refinement phase, and a production phase. For each phase, there can be strategies that are more applicable than other strategies. Thus, a user may configure the active learning framework to use a different selection strategy depending on the phase. For each strategy, the active learning framework 200 may provide as input to the strategy the transformed set of image data and the user-assigned label (if any) that is associated with each image. Also, note that while the examples below use PCA as the main transform, there are other transforms that could be used a suitable replacement or in addition to PCA.

The early stage of an active learning workflow is typically used to select an initial set of images for processing. For example, the user may have created a large image population and may be interested in extracting a smaller set of "interesting" images for processing. At this phase, there may not be any labels on the images being selected.

An example of an early phase selection strategy 204 is "uniform sampling." In this case, selection strategy 204 identifies every $N_{th}$ image, where N may be a user-specified or automatically determined parameter. For example, if configured with N=10, selection strategy 204 selects every tenth image. Image selector 210 can be configured to utilize this strategy when it is desired to have uniform coverage over an image population. A second such example is random sampling, in which strategy 204 can randomly select images from controlled images 208. Uniform and random sampling may be desirable when a user wants to select the most common types of images.

Another example of a selection strategy 204 that may be used in an early phase selects images that are representative of the entire set of controlled images 208. For example, selection strategy 204 may implement a strategy referred to as "K-Means clustering with PCA." For this selection strategy, a user may select the number of images N that they desire to obtain from the image population. Selection strategy 204 can utilize a transform to dimensionally reduce the image data using PCA or AE. Selection strategy 204 can implement a "Mini Batch K-Means Clustering" algorithm to find centroids of the dimensionally reduced image data using the number of images N as the number of centroids for the K-Means data. An example K-Means Clustering algorithm used in some implementations is described in Sculley, D., (2010, April) Web-scale k-means clustering, in WWW '10: *Proceedings of the 19th international conference on World Wide Web*, WWW '10: The 19th International World Wide Web Conference, Raleigh North Carolina (pp. 1177-1178), Association for Computing Machinery, which is hereby incorporated by reference. Selection strategy 204 can then return the image nearest to each centroid as the images of interest. This strategy may be useful when the user desires to start labeling with images that fairly represent the entire population of images, and not necessarily the most common images. By finding the centroids within the N clusters, selection strategy 204 can select N images that each characterize one natural grouping within the data. In this way, any relatively populous classes of images (typically represented as high spatial density areas within the data) will not dominate the results of the strategy.

A further example of an early phase selection strategy 204 is referred to as "outlier detection." For example, selection strategy 204 may implement an outlier detection strategy referred to as "farthest nearest neighbors." For this selection strategy, the user may select the number of images N that they desire to obtain from the image population. Selection strategy 204 can utilize a transform, such as PCA described above, to reduce the dimensionality of each image to a single rank feature-vector. Selection strategy 204 determines, for each image in the population, the distances from its K nearest neighbors using the transformed feature vectors. The value of K may be configured as a hyperparameter for selection strategy 204. For each datapoint, selection strategy 204A calculates the mean of its K nearest neighbor distances. Selection strategy 204 selects the N samples with the largest mean nearest neighbor distance as the images of interest. Outlier images selected by selection strategy 204 are those that do not have many images that "look similar" to them within the overall dataset. By finding images whose nearest neighbors are relatively far away, a selection strategy can find the outlier images. It should be noted that there are many other heuristics for determining outlier images that may be used as a selection strategy 204.

In the iterative refinement phase of an active learning workflow, the user may have labeled some images within controlled images 208 and may desire to identify new images to help improve or refine the labels or the user may have developed a machine learning model and may wish to utilize new images to improve or refine the machine learning model.

An example of a strategy 204 that may be used during an iterative refinement phase obtains images that are unlike those that have already been labeled, which can improve the diversity of the training dataset. In this example, strategy 204 identifies images that are unlike the currently labeled images. In some aspects, strategy 204 may implement a radius-based neighbor learning algorithm that first utilizes a transform to reduce the dimensionality of the images, such as PCA. In some example implementations, this algorithm has the following steps:

a. The user may provide as input the number of images N that the user wishes to select from the image population.

b. The user may provide a value D, which governs the length of the reduced-dimensionality feature vector created by PCA for each transformed image.

c. The algorithm is configured to create D-dimensional spheres of radius R (e.g., "D-spheres") around datapoints (e.g., feature vectors for associated images). The radius R may be chosen heuristically, and may be the standard deviation of the data (e.g., the standard deviation of the values of each feature vector field in the feature vectors comprising the transformed images) multiplied by D. Initially, D-spheres are created around datapoints that are associated with labeled images. Thus, an exclusion zone is created around datapoints for previously labeled image to ensure that images similar to the previously labeled images are not selected.

d. Images having datapoints within each D-sphere are excluded from consideration for the random selection process in the next step. Images having datapoints outside of the D-spheres are candidates for selection. In some aspects, if this exclusion results in the number of available images being less than a predetermined or configurable threshold percentage (e.g., 0.1%) of the original number of images, the radius R may be reduced. For example, R may be reduced by ten percent. The reduction of R may be iteratively continued until the number of selected images is satisfactory (e.g., greater than 0.1% of the original number of images).

e. A datapoint is randomly selected from the remaining data (i.e., datapoints that have not been excluded as being within a D-sphere). This generally picks a point in a more densely populated area, which can be beneficial. The selected datapoint is added to the set of selected images 212 (also referred to as "images of interest 212") and a new D-sphere is created around the selected datapoint to prevent images similar to the selected datapoint from being selected in the next iteration.

f. Steps d and e may be repeated until N images are selected from the image population.

By iteratively excluding the local regions surrounding labeled and selected images, areas of the data are identified that are novel.

FIGS. 10A-10E graphically illustrate the above-described selection strategy in accordance with at least one example technique described in this disclosure. In order to better explain the techniques, a value of D=2 is used in the example illustrated in FIGS. 10A-10E. Thus, a two-dimensional graph can be used to illustrate the techniques. For the purposes of the example, assume that a user of the system wishes to add fifty novel images to selected images 212.

Figure 10A:
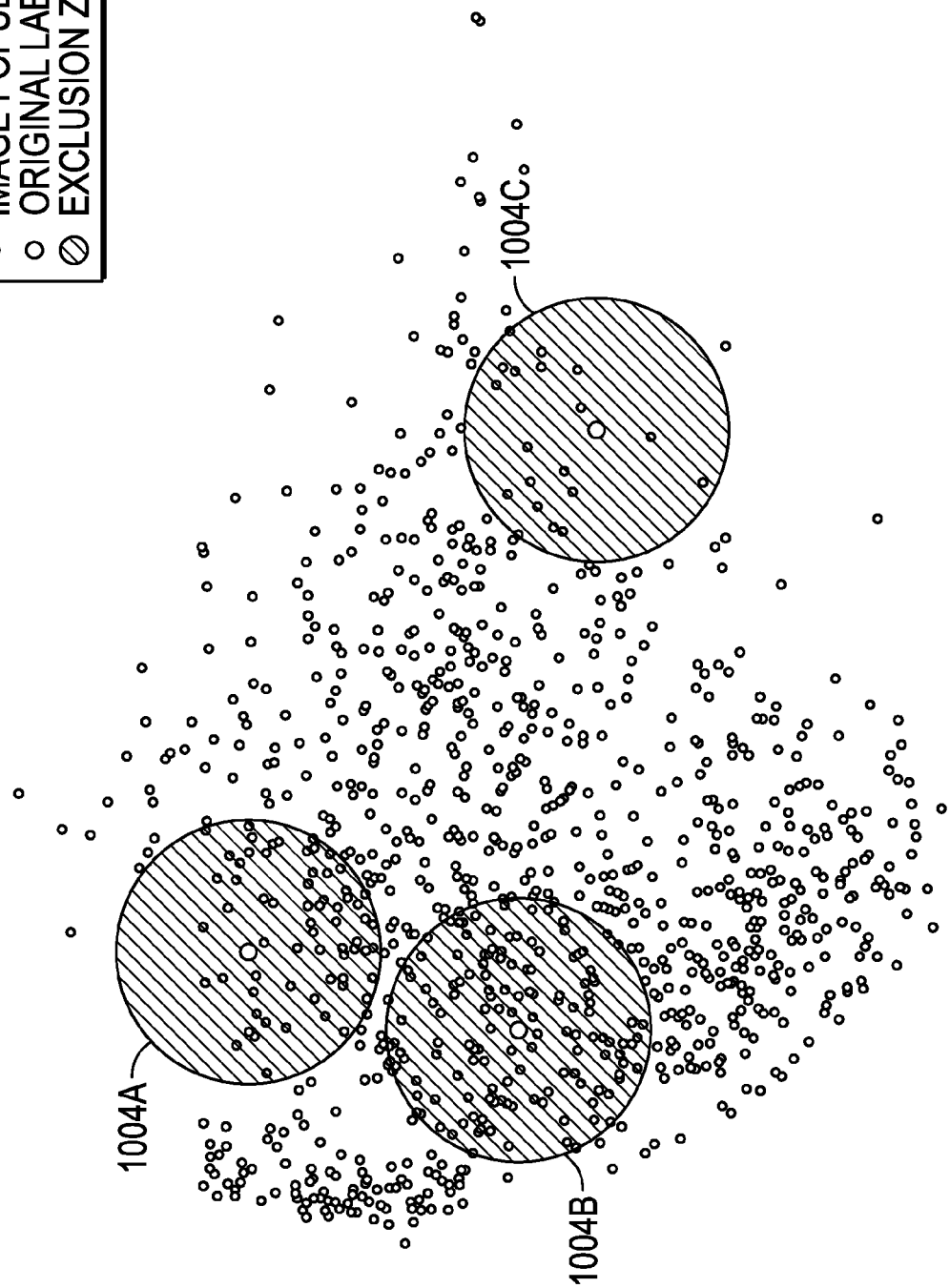
FIGS. 10A-10E are graphs illustrating a selection strategy for an image population in accordance with at least one example technique described in this disclosure.

FIG. 10A illustrates an initial creation of D-spheres around labeled datapoints. In this example, three datapoints are associated with labeled images. D-spheres 1004A, 1004B and 1004C have been created around the datapoints for the labeled images. Datapoints within D-spheres 1004A, 1004B and 1004C are excluded from selection.

Figure 10B:
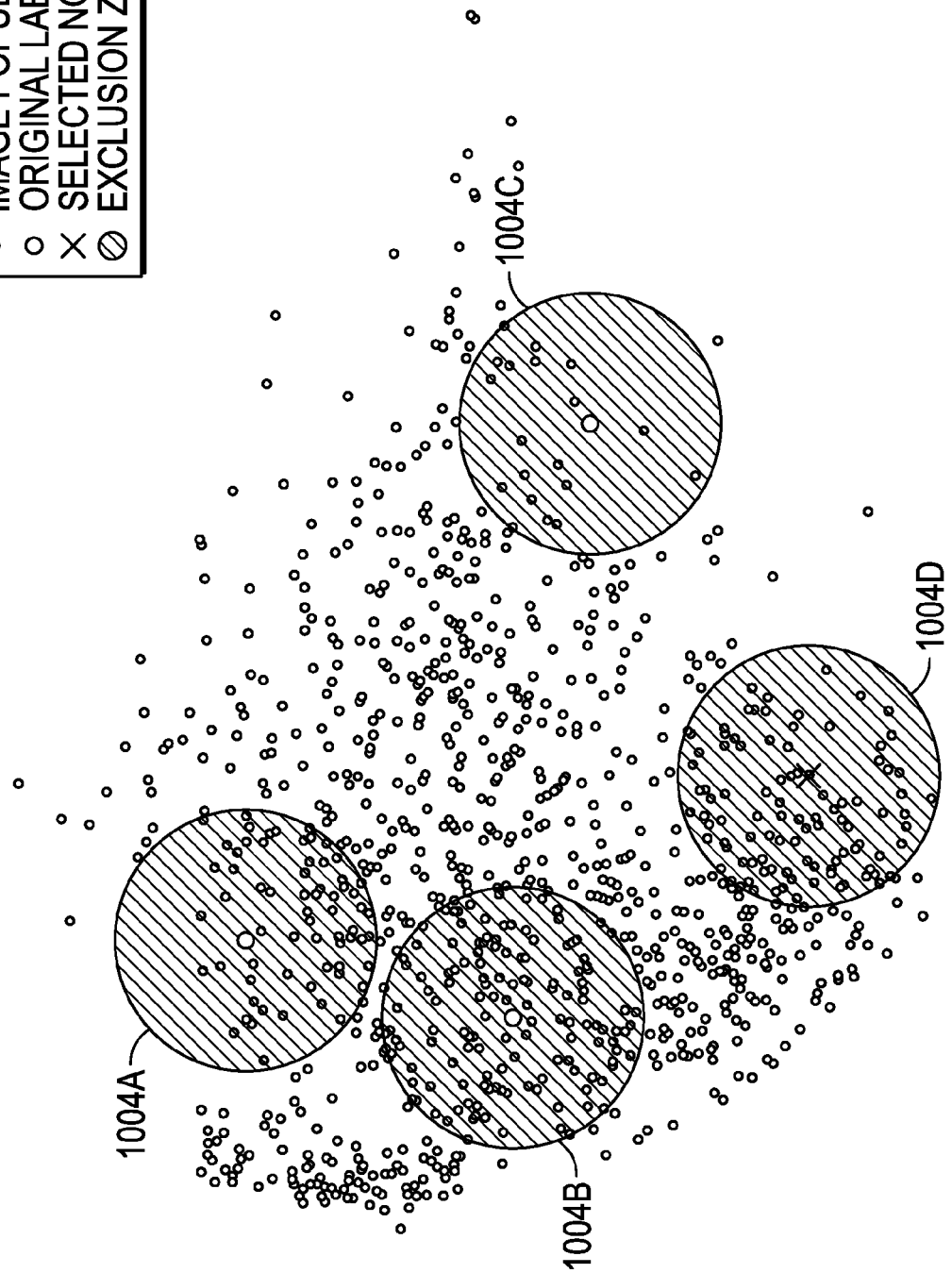

FIG. 10B illustrates selection of a datapoint for an unlabeled image. A datapoint can be randomly selected from any of the datapoints that are not within an exclusion zone defined by any of D-spheres 1004A-1004C. The selected datapoint can be added to selected images 212. A new D-sphere 1004D is created around the selected unlabeled datapoint (identified by the "X" at the center of D-sphere 1004).

Figure 10C:
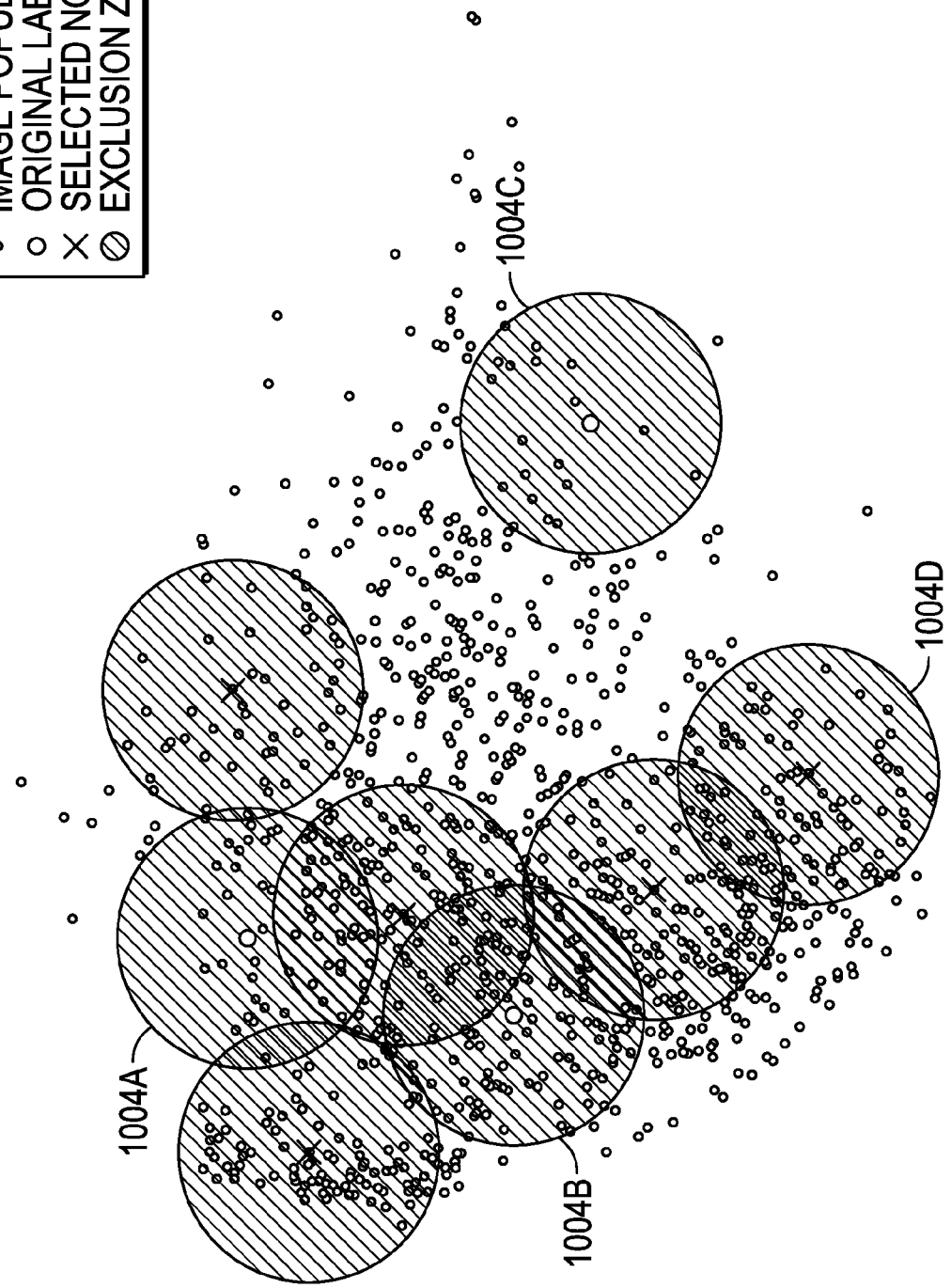

FIG. 10C illustrates the state of the selection strategy after four further iterations of the selection algorithm. Four new D-spheres have been created around the four selected datapoints. At this point in the example, there are five novel images selected, represented by the "X" at the center of the newly created D-spheres.

Figure 10D:
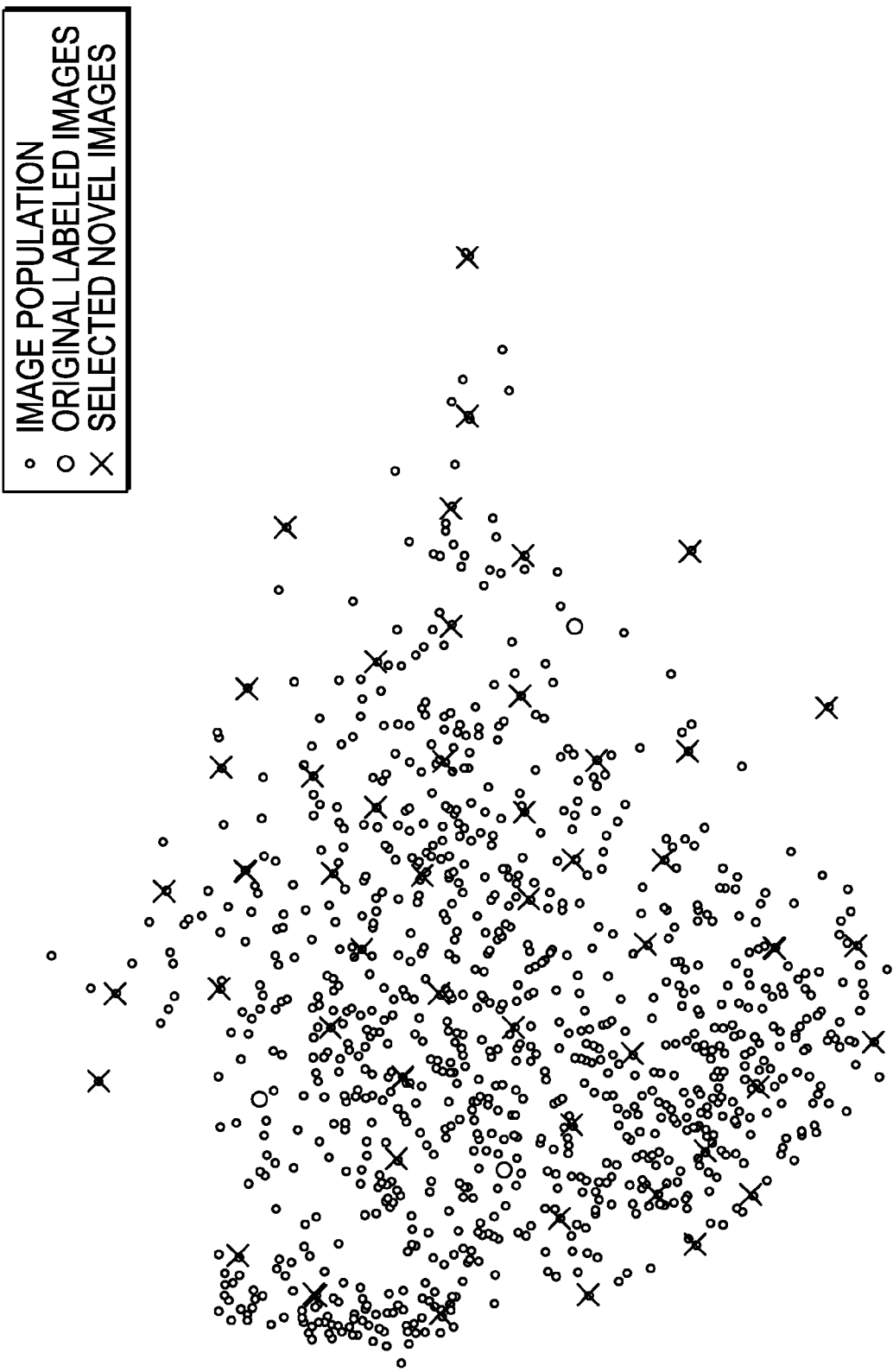

FIG. 10D illustrates the state of the selection strategy after further iterations have resulted in the selection of fifty novel images, represented by the "X" s in FIG. 10D.

Figure 10E:
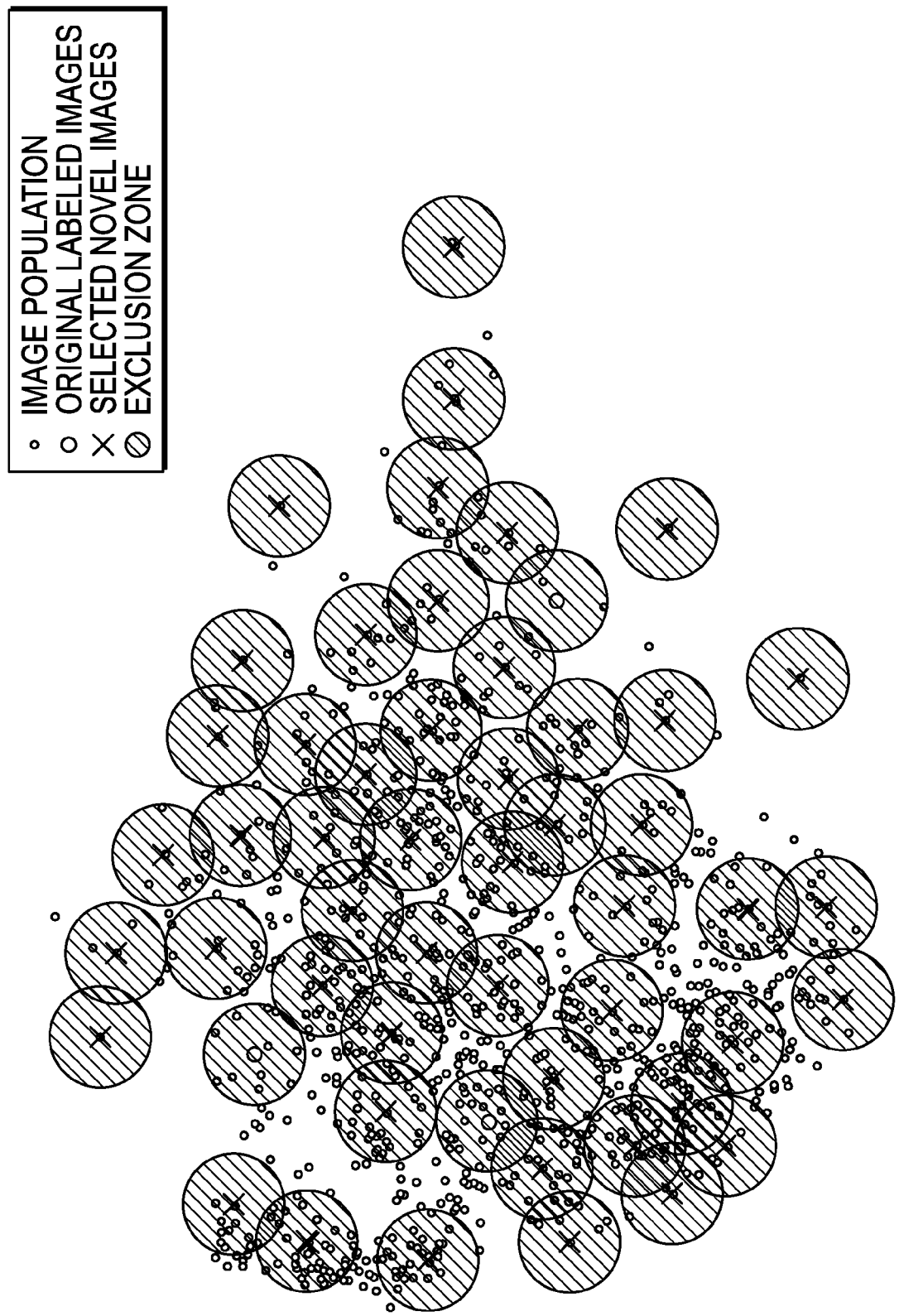

FIG. 10E illustrates the fifty selected novel images along with their respective D-spheres. It may be the case that the original value of R was too large resulting in exclusion of so many images that there were not any images available for selection prior to fifty images being selected. As can be seen in FIG. 10E, the radius R of the D-spheres has been reduced in order to create smaller D-spheres (e.g., smaller exclusion zones) such that the selection strategy can select fifty novel images.

This strategy can also be used in early-stage development as it can function without any labeled images. For example, a datapoint (e.g., an unlabeled datapoint) can be selected at random, and a D-sphere can be created around the randomly selected datapoint. Steps d and e above can be repeated until the desired N datapoints are selected.

Another selection strategy 204 that may be used during an iterative refinement phase identifies images that are most similar to images having an indicated label or class. Image selector 210 can be configured to utilize this strategy when it is desired to find additional images that are similar to an existing set of images. In this example, selection strategy 204 may implement an algorithm referred to as "Nearest neighbors." In this selection strategy, a user may indicate a class containing images where the user would like to find more images in the same class. The user also indicates a number of images N that the user desires to extract from the image population. Similar to many of the strategies above, this strategy utilizes a transform to reduce the dimensionality of the images first, such as PCA. Images within the class of interest can be assigned a label of one (1) or other label to indicate membership in the class and all other images may be assigned a label of zero (0) or other label to indicate that the images are not members of the desired class. Every datapoint in the image population is assigned a likelihood of membership in the desired class, calculated as the weighted sum of the labels of its M nearest neighbors in the reduced-dimensional dataspace. M can be a hyperparameter that is configured for selection strategy 204. M can be considered a regularization parameter that can be used to determine how many neighbors are queried for each datapoint. The bigger M is, the farther the influence of labels will spread, which can smooth the response of the selection strategy. In some aspects, M is a number between 5-100, where a small number may return a sample nearly identical to one of the labeled samples, and a larger number might be more of a "mix" of multiple labeled samples. The likelihood can either be a weighted sum (weighted by the Euclidian distance from the neighbors) or an unweighted sum. This selection strategy 204 selects the images closest to the pre-labeled images of interest.

In the production phase of an active learning workflow, the user may have developed a machine learning model and may wish to utilize new images to improve or refine the machine learning model.

An example of a strategy 204 that may be used during the production phase is a strategy that selects images that are unlike images previous processed by the system. In this example, strategy 204 can utilize a PCA model trained on the existing image population to evaluate new images encountered during production. If new images are significantly outside the labeled region or the population in general, the images may be marked for selection as useful images.

Another example of a strategy 204 that may be used during the production phase is referred to as "uncertainty sampling." In uncertainty sampling, selection strategy 204 can utilize scores from an in-production machine learning model to identify images in controlled images 208 for which the in-production machine learning model is least certain. The identified images can then be referred to a human in order to have the human provide accurate labels and a new machine-learning model can be trained that includes the newly labeled images.

A further example of a selection strategy 204 that can be used during an in-production phase selects images that match a particular class. Selection strategy 204 can identify images where a score returned from an in-production machine learning model is greater than a specified threshold (either from the model or user-defined). This type of selection strategy can be useful when a trained model is available that may be currently used on an inspection system for a current production line and the user desires to improve the model in some way.

Another example selection strategy is "query-by-committee." Image selector 210 can pass the images through multiple machine learning models and select images that the machine learning models disagree on. Image selector 210 can be configured to use this strategy when it is desirable to compare old vs. new models. As an example, the system may retain the last N production inspection models. For each new image, selection strategy 204 calculates a score for each of the N models. If the deviation of the scores is greater than a configurable threshold, the image is marked as useful and selected. This selection strategy can identify changes from previous models and can be used, for example, to have a user verify correct operations of an in-production machine learning model.

Some strategies 204 do not require machine-learning techniques. As an example, a strategy 204 can be a density filter that filters out images that have a high spatial density. In some aspects, image selector 210 can be configured to utilize this strategy when receiving defect images from a production system, where the controlled images 208 are dominated by highly-similar images within a region of high spatial density. In this case, it is desirable to select images from other regions to provide a balanced set of defect images for training.

Additionally, a strategy 204 may be configured to select images that contain a specified string in a file name or path (e.g., an absolute or relative path). Image selector 210 can be configured to utilize this strategy when images were already pre-labeled on the file system using their file name or directory name as a label indicator (e.g., a name indicative of a defect, lack of defect, or other quality).

As will be appreciated from the disclosure, the techniques described herein are not constrained to one particular selection strategy or heuristic. Rather, the techniques provide a mechanism for leveraging one or more algorithms to select a subset of images Further, although certain strategies have been discussed in the context of an active learning workflow phase, any of the selection strategies may be used in phases or at points or phases in an active learning workflow other than those discussed above.

Image selector 210 can store the images selected using one or more of the selection strategies 204 as images of interest 212. The images of interest 212 can include the original image prior to transformation, as well as reasoning data from the strategy that indicates why it was selected. In some aspects, selection strategies may be selectively activated and deactivated. More than one selection strategy may be activated for a workflow, in which case, the images of interest 212 may include images selected by any one or more of the activated selection strategies. If multiple strategies 204 select an image as useful, then in some aspects, the image is stored once and the reasoning data from each selected strategy is combined together and stored with an association to the image of interest. In some aspects, the image is stored once and is marked or tagged with indicators of the strategy or strategies that caused the image to be selected.

Image labeler 214 can apply labels to images in the images of interest 212. In some aspects, the images may be manually applied via a user interface of image labeler 214. Image labeler 214 can present images that have been selected as "useful" to the user (e.g., images in images of interest 212) for labeling via user interface 216. As an example, a person with knowledge of the subject of the images (i.e., a subject matter expert) can utilize user interface 216 of image labeler 214 to provide an accurate label for the given image. In some aspects, user interface 216 of image labeler 214 can provide image thumbnails in a grid (see e.g., FIG. 9B), a higher-resolution image in a separate area (see e.g., FIG. 9D), and the option to explore a full-resolution version of the image across a full screen of user interface 216 (see e.g., FIG. 9E). These three different viewing modalities can facilitate labeling images using a full range of macro-scale and micro-scale features. After labeling, the labeled image can be stored in labeled image storage 217 with its label in a digital form, such that it can easily be used to train a machine learning model.

In some aspects, image labeler 214 may be an auto-labeler that automatically applies labels to the images in images of interest 212. The system can be configured with one or more auto-labelers. One example auto-labeler may use simple image attributes obtained by image gatherer 202, such as the filename, to determine the appropriate label—For example, some file names may contain the string "defect" or "nogood" indicating that the file contains image data for a product that has a defect. Other file names may contain the string "good," "okay," etc. indicating that the file contains image data for a product that does not exhibit a defect. Other auto-labelers may use more advanced techniques, such as utilizing a machine learning model to assign labels.

FIG. 2B is a block diagram illustrating an example embodiment of an active learning framework 200 cooperating with a training system 250, in accordance with at least one example technique described in this disclosure. Training system 250 can receive images labeled by image labeler 214 and store the labeled images as training data in training data storage 256. In some aspects, training system 250 can include model trainer 252 and model analyzer 257.

Model trainer 252 can train inspection model 255 from training data in training data storage 256 and store the trained model in model storage 254. Inspection model 255 can be a machine learning model, a decision tree or an inspection recipe generated from a machine learning model and/or decision tree. In some aspects, model storage 254 may provide version control capability. The training process may be iterative, in which case the user can modify training hyperparameters to optimize model performance. Further, if the model performance is not sufficiently high, the user can go back to execute active learning algorithms from active learning framework 200 to select different or additional images, label the images, and retrain inspection model 255. If inspection model 255 performance is still not sufficiently high, the user can go as far back as adding additional images from image repository 206 to the controlled images 208 via image gatherer 202 and begin the training process anew.

Model analyzer 257 can provide data regarding the performance of inspection model 255 to allow users to decide whether to deploy the given model. Common metrics include:

accuracy (fraction of all model predictions which are correct).

precision (fraction of positive results which are correct, which is useful when the class distribution is unbalanced).

recall (fraction of samples from a class which are correctly predicted by the model).

F1-score (harmonic mean of precision and recall)

Model execution time on a typical image

The above metrics are examples, other metrics for measuring the performance of inspection model 255 are possible.

The metrics can be organized in a table known as a confusion matrix. A confusion matrix illustrates the performance of a machine learning model in terms of true positives, true negatives, false positives, and false negatives. In some cases, the metrics above may compare the label considered as the correct label to a label assigned by a machine learning model to determine the confusion matrix. In such cases, a test set of images may be labeled automatically or by experts using the image labeler 214 or other labeling system. The labels applied to the test set can be considered the correct label and provide the truth benchmark. The test set can be passed through an inspection model. The labels generated by the inspection model can be compared with the previously generated correct labels and the results of the comparisons can be used to create the confusion matrix. In some aspects, a portion of the labeled data can be held apart from the model training process to create the test set of image data.

If the model does not meet desired performance standards, a user may choose from one or more options to improve performance. These options include: 1) change hyperparameters, 2) label more images, 3) get more images to label via additional strategy executions, and 4) add more images to the population. This iterative process can be continued until the model performance is sufficient.

When a user is satisfied with the performance of inspection model 255, the model can be deployed to production system 258. The metrics mentioned above can continue provide a way to monitor the performance of inspection model 255 in production as well.

Active learning framework 200 and/or the components of active learning framework 200 can record various execution records 218 for workflows as a workflow progresses through the framework. In some aspects, execution records 218 may be generated for transforms 220, selection strategies 204, image gatherer 202, model trainer 252, image labeler 214, and model analyzer 257. For example, execution records 218 may store the date and time that particular transforms were performed, data regarding the results of the transform, parameters for the transform, the date and time image selection strategies were executed and the parameters for the image selection strategies. Further, execution records 218 may store similar data regarding model training and the results of model analyzer 257 with respect to inspection models 255. The execution records 218 can facilitate efficient processing of workflows and the ability to recreate workflows.

In some implementations, active learning framework 200 may support a plugin architecture where users can add components as plugins to the framework 200 without requiring a complete rebuild or recompilation of the entire framework 200. For example, one or more of transforms 220, strategies 204, image gatherer 202, image selector 210, model trainer 252, model analyzer 257 and image labeler 214 may be implemented as plugins.

Figure 3:
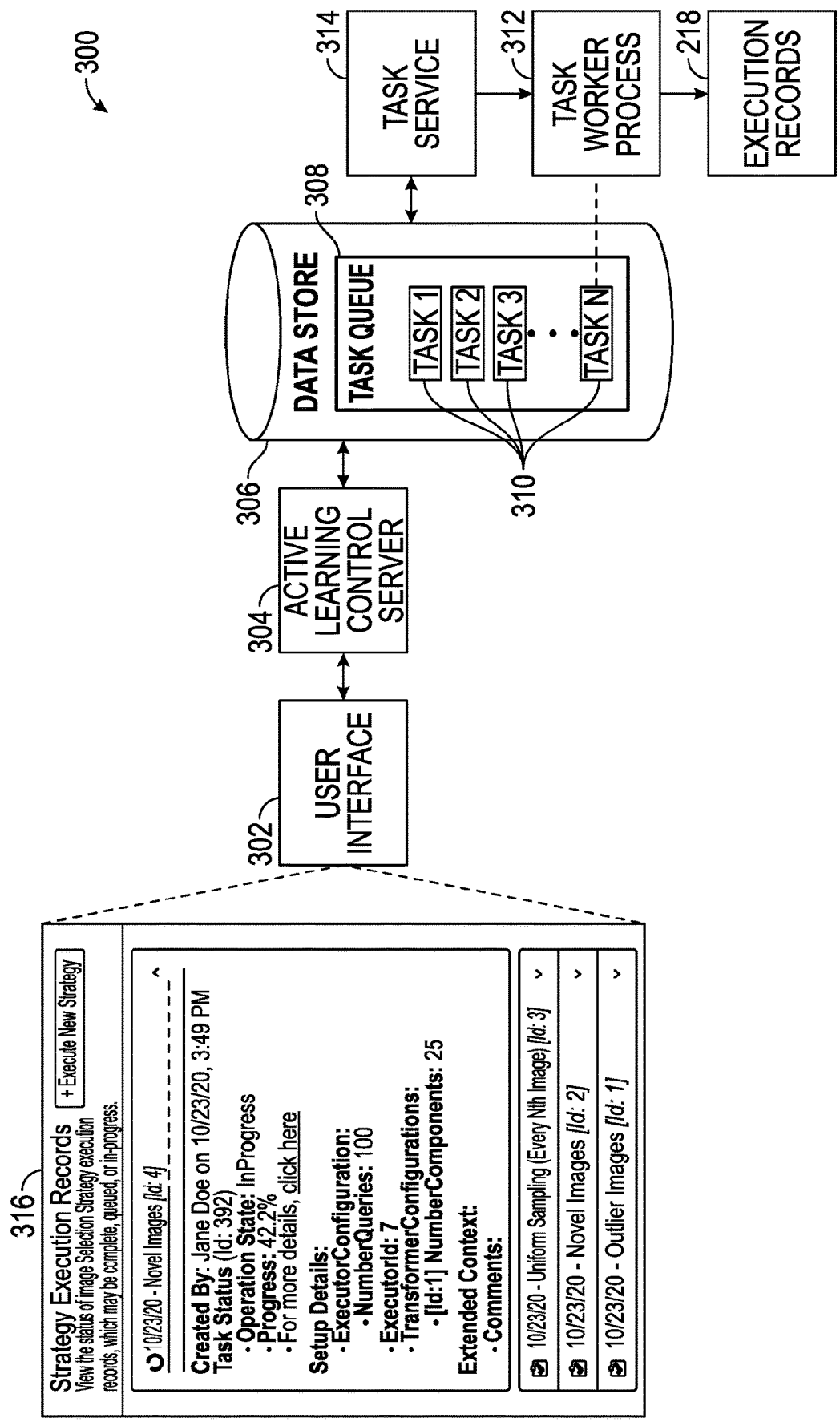
FIG. 3 is a block diagram illustrating an example asynchronous workflow management system, in accordance at least one example technique described in this disclosure.

FIG. 3 is a block diagram illustrating an example asynchronous workflow management system 300, in accordance at least one example technique described in this disclosure. Some or all of the components of active learning framework 200 and training system 250 can be referred to as tasks (e.g., tasks 310). That is, a task 310 can be an instance of image gatherer 202, transform 220, selection strategy 204, image labeler 214, model trainer 252, and/or model analyzer 257. A first task 310 may initiate other tasks 310. For example, a task may be a selection strategy task that initiates one or more transform tasks. As an example, a user can instruct the workflow management system 300 to execute a selection strategy 204 (FIG. 2A, FIG. 2B) for selecting useful images via user interface 302. User interface 302 can communicate with active learning control server 304 that can create a task 310 insert the task into task queue 308 to be executed asynchronously and perhaps concurrently with other tasks managed by workflow management system 300. Task queue 308 may be maintained in data store 306. Task queue 308 can be managed by task service 314. When a new task 310 is discovered in task queue 308, task service 314 can invoke an appropriate task worker process 312 (also referred to as a "task process 312) to carry out the task. For example, a task worker process 312 can execute a strategy 204, transform 220, image gatherer 202, model trainer 252, model analyzer 257, or image labeler 214 as well as other components. As a task worker process 312 executes, it often builds up an execution record and stores it in execution records 218. There may be multiple instances of task worker processes 312 executing concurrently with one another. There may be multiple instances of the same type of task executing concurrently, each with their own entry in task queue 308 and each with their own task worker process 312. For example, there may be multiple instances of a transform 220 executing concurrently. The different instances of the same transform 220 may be executing to transform images for different instances of a selection strategy 204.

In some aspects, user interface 302 can be used to provide data regarding tasks' 310 progress. In some aspects, active learning control server 304 periodically polls the status of each unfinished task 310 and displays the data to the user. In some aspects, the progress (e.g., a quantitative metric between 0% and 100%), as well as details of the task 310 are shown to provide adequate insight into the task 310 that is executing. and update the progress as appropriate. Output 316 shows an example output for tasks 310 executed asynchronously by workflow management system 300. Example output 316 shows the progress of a "Novel Images" selection strategy (task ID 4). Details of other execution records can, upon selection, be expanded. In the example shown in FIG. 3, output 316 shows three other selection strategy tasks that may be selected, a "uniform sampling" strategy (task ID 3), and another instance of the "Novel Images" selection strategy (task ID 2) and an "Outlier Image" selection strategy (task ID 3). In some aspects, as shown in FIG. 3, output 316 may include records for one type of task (e.g., selection strategies). Other output elements may be provided for other types of tasks (transforms, image selection, model training etc.)

Active learning framework 200 and asynchronous workflow management system 300 can cooperate to facilitate the efficient iterative development of inspection models. For example, inspection models can be analyzed and if not satisfactory, a user can adjust transformation parameters, image selection strategy parameters etc. and repeat a workflow to create a new (and hopefully improved) inspection model. Active learning framework 200 can use execution records and metadata to avoid duplicative processing. For example, if a user desires to rerun a workflow with different image selection strategy parameters, but no changes to the transformation parameters, the active learning framework can bypass image transformation and reuse the transformed images created in a previous workflow. Similarly, if a workflow uses a different image selection strategy, but the different strategy uses the same image transforms as a previous workflow, active learning framework can again bypass image transformation and use the images as previously transformed for the different selection strategy.

In some aspects, active learning framework 200 and asynchronous workflow management system 300 may be used to generate an inspection recipe. Further details on such an inspection recipe generation system are provided in co-filed, copending U.S. Provisional Patent Application Ser. No. 63/131,173, entitled "MACHINE LEARNING-BASED GENERATION OF RULE-BASED CLASSIFICATION RECIPES FOR INSPECTION SYSTEM," which is hereby incorporated by reference.

Figure 4:
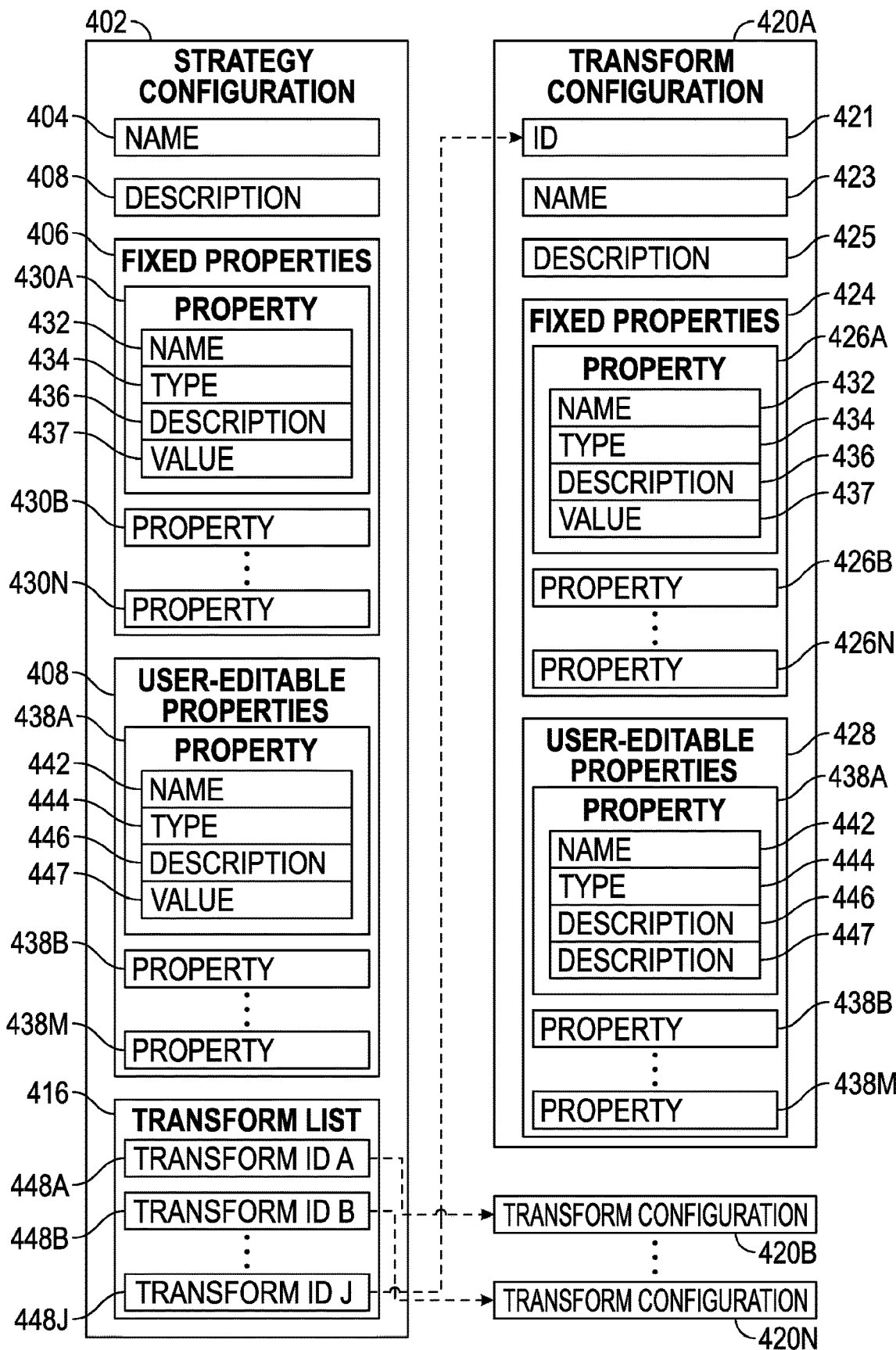
FIG. 4. illustrates example configuration parameters for strategies and transforms for active learning algorithms employed by selection strategies, in accordance with at least one example technique described in this disclosure.

FIG. 4 illustrates example configuration parameters for strategies and transforms for active learning algorithms employed by selection strategies, in accordance with at least one example technique described in this disclosure. The example illustrated in FIG. 4 includes a strategy configuration 402 for a selection strategy 204 and transform configurations 420A, 420B, 420N (generically referred to as a "transform configuration 420") for transforms 220. Strategy configuration 402 includes name 404, description 405, fixed properties 406, user editable properties 408, and transform list 416. Name 404 provides a name for the selection strategy and description 405 provides descriptive text for the selection strategy.

Fixed properties 406 specify properties 430 that are included for each strategy. In some aspects, fixed properties are those that do not need to be set by a user. A property may include a name 432 identifying property, a type 434 providing a data type for the property, a description 436 providing descriptive text for the property, and a value 437 that specifies the property value. Examples of fixed properties 406 include the name of an executable file that implements the strategy, an entry point into the executable file etc.

User editable properties 408 define various properties 438 that can be supplied, added, or modified by a user. As with fixed properties 406, user editable properties can include a name 442, a type 444, a description 446 and a value 447 for the property. Examples of user editable properties 408 include a properties that specify the number of items to be selected, selection strategy parameters, property, a "selected option" property, and a "checkbox" property. User editable properties 408 can include addable properties that define a group of one or more user configurable properties that can be provided multiple times together. Examples of such addable properties include a "label identifier" string entry and an "IsDefect" Boolean property, for which the user can add any number of label and defect checkbox entries to specify which labels are considered defects and which are not.

Transform list 416 identifies the transforms that are to be applied to input images. In some aspects, transform list 416 can include a list of transform identifiers associated with transforms that are to be applied to images as part of the selection strategy. In the example illustrated in FIG. 4, transform ID A 448A may have a value of the transform identifier 421 of transform configuration 420A.

Transform configuration 420 can include an identifier 421 that can be a unique identifier for the transform. Additionally, transform configuration 420 can include a name 423 and description 425 that are text strings providing a name and descriptive text for the transform. Similar to strategy configuration 402, transform configuration 420 can include fixed properties 424 and user editable properties 428. Properties 426 of fixed properties 424 can have a name 432, type 434, description 436 and value 437. Examples of fixed properties include a script name property 442 that defines a file name and/or path name for an executable file that implements the transform. In some aspects, the executable file may be a python script that is interpreted. A further example fixed property can include an entry point property that specifies an entry point in the executable file. In some aspects, the entry point may be a function name of a function in the python script identified by script name property.

Properties 438 of user editable properties 428 can include a name 442, type 444, description 446 and value 447. User editable properties 428 are properties that can be added, set or modified by a user and that control aspects of the execution of the image transform.

FIG. 5 illustrates an example user interface form generated according to the strategy and transform configurations of FIG. 4. In some implementations, strategy configuration 402 and transform configuration 404 may be defined using a markup language such as eXtensible Markup Language (XML). In such implementations, the XML code may be used to generate the user interface form such as that shown in FIG. 5.

Figure 6:
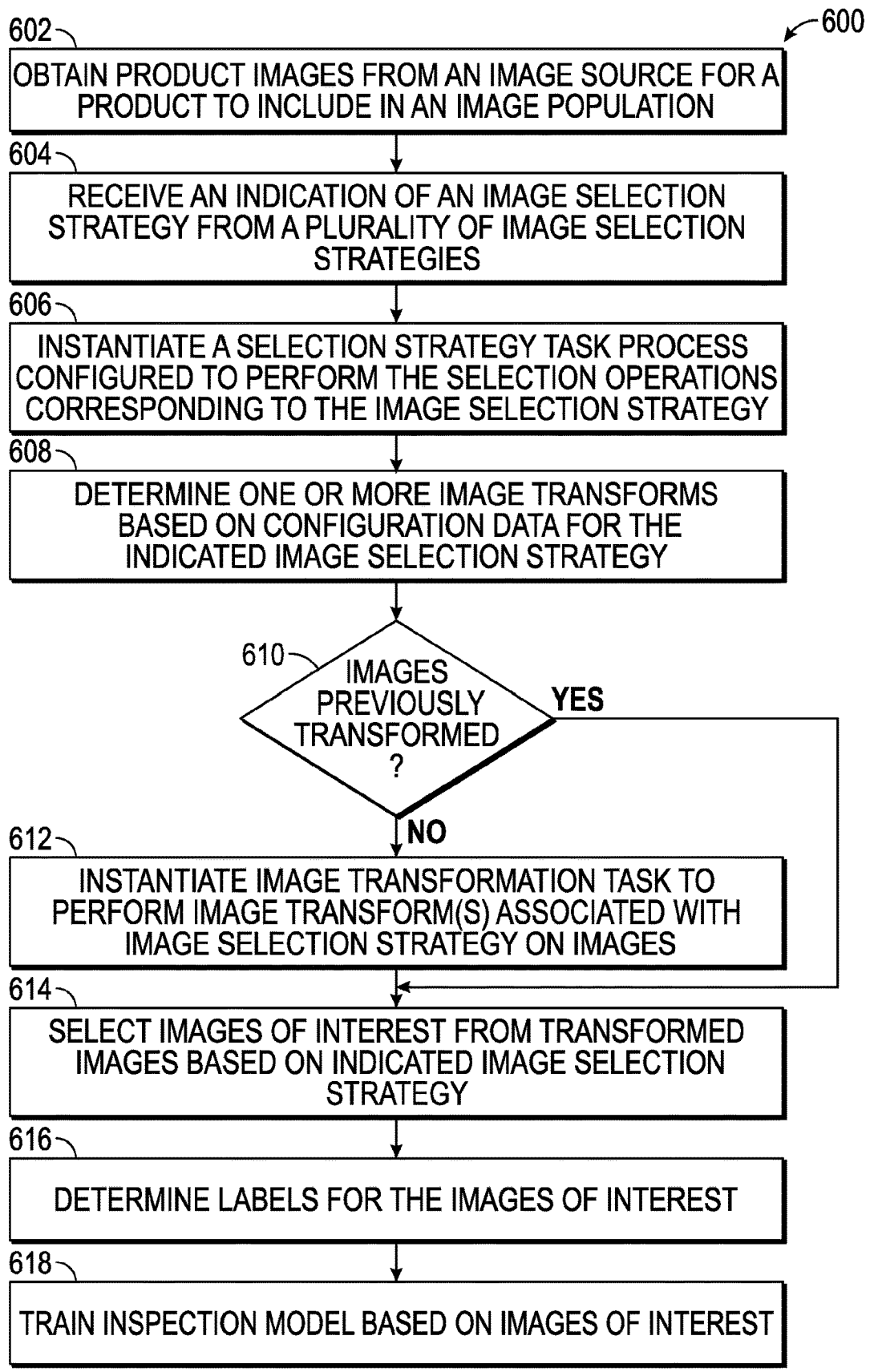
FIG. 6 is a flow diagram illustrating example operations for selecting product images for processing, in accordance with one or more techniques of this disclosure.

FIG. 6 is a flow diagram illustrating example operations for selecting product images for labeling and use in training an inspection model, in accordance with one or more techniques of this disclosure. An active learning framework may obtain, from an image source, product images to include in an image population (602). Next, the active learning framework may receive an indication of an image selection strategy from a plurality of image selection strategies (604). The image selection strategies can define selection operations for determining if a product image is to be included in a set of images of interest. Next, a framework may instantiate a selection strategy task process corresponding to the image selection strategy, where the selection strategy task process is configured to perform the operations of the selection strategy (606). Next, the active learning framework may determine one or more image transforms from a plurality of image transforms based on configuration data for the indicated image selection strategy (608). The active learning framework may determine whether the plurality of product images in the image population have been previously transformed according to the image transforms (610). If the image has not been transformed ("NO" branch if 610), the active learning framework may instantiate one or more image transformation task processes corresponding to the one or more image transforms. The one or more image transform task processes are configured to perform image manipulation operations to create transformed image data (612). If the image has already been transformed ("YES" branch of 610), the active learning framework may bypass transformation tasks. Next, an active learning framework may select a subset of images from the image population for inclusion in the set of images of interest based on the indicated image selection strategy and the transformed image data (614). Next, an image labeler of the active learning framework may determine an indication of one or more descriptive labels and apply the one or more descriptive labels to the respective sets of images (616). Next, an active learning framework may train a machine learning model for a product inspection system based on the set of images of interest (618).

Figure 7:
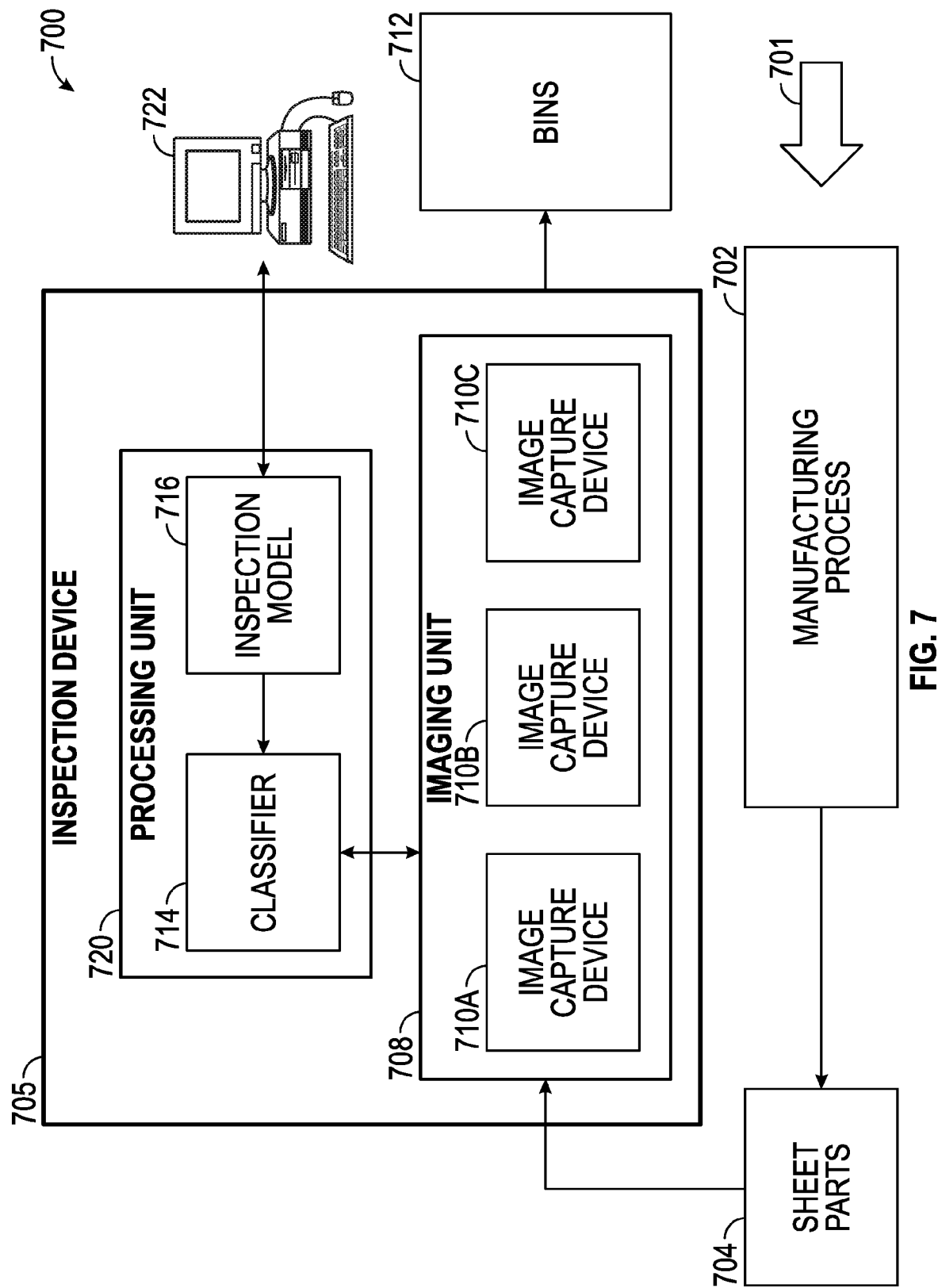
FIG. 7 is a block diagram illustrating a system for manufacturing a plurality of sheet parts, and for imaging and inspecting the plurality of sheet parts for defects, in accordance with at least one example technique described in this disclosure.

FIG. 7 is a block diagram illustrating a system for manufacturing a plurality of sheet parts, and for imaging and inspecting the plurality of sheet parts for defects, in accordance with at least one example technique described in this disclosure. In the example illustrated in FIG. 7, system 700 includes inputs 701, manufacturing process 702, sheet parts 704, inspection device 705, imaging unit 708, one or more image capture devices 710A-710C (collectively, "image capture devices 710"), bins 712, processing unit 720, and user interface 722.

Manufacturing process 702 as shown in FIG. 7 receives various inputs 701 (e.g., material, energy, people, and machinery) and produces an output including a plurality of sheet parts 704. Manufacturing process 702 is not limited to any particular type or form of manufacturing and is illustrative of any type of manufacturing process operable to produce sheet parts. In some examples, inputs 701 include a long continuous sheet of a roll good product (e.g., a polyester film (e.g., an optical film)), and sheet parts 704 may be parts made from the roll good product. Manufacturing process 702 may include partitioning individual portions of the long continuous sheet to create sheet parts 704. For example, sheet parts 704 may include pieces cut from the long continuous sheet. In some examples, sheet parts 704 include pieces of the long continuous sheet cut in the shape of an object (e.g., a mobile device, a laptop computer, a desktop computer, a television, or a window). Once produced by manufacturing process 702, sheet parts 704 may be applied to a surface of the respective object.

Sheet parts 704 may be substantially similar in shape, material composition, and thickness such that each sheet part of the plurality of sheet parts appears to be alike. In some embodiments, each sheet part of sheet parts 704 comprises a single layer of transparent or semi-transparent material or may include a plurality of layers of materials. Sheet parts 704 may comprise transparent or semi-transparent material intended to provide particular levels of light transmission, generally through the thickness dimension of sheet parts 704, for a particular wavelength of light or for a range of wavelengths of light. Sheet parts 704 may have various requirements related to the flatness of the top and/or bottom surfaces of the sheet parts, and/or related to the lack of defects.

During the manufacturing process 702, sheet parts 704 may accrue a variety of defects. In some examples, defects include particles, scuffs, scratches, dents, streaks, or impressions. Inspection device 705 may inspect sheet parts 704 as they move through imaging unit 708 and determine a classification for the sheet part. In some aspects, there may be two classification, one indicating that the sheet part has a defect, the other indicating that the sheet part is not defective. Other classifications are possible. For example, a classification may indicate that the part may need rework before it can be used.

System 700 may manufacture and inspect sheet parts 704 in an assembly line. In other words, after manufacturing process 702 creates sheet parts 704, the sheet parts may travel through inspection device 705. Subsequently, sheet parts 704 may be sorted into bins 712. Sheet parts 704 may continuously cycle through system 700 such that additional sheet parts enter inspection device 705 as newly inspected sheet parts exit inspection device 705 into bins 712. In some examples, a moving belt (e.g., a conveyor belt) continuously transports sheet parts 704 from an endpoint of manufacturing process 702 through inspection device 705 to bins 712.

Inspection device 705 may include imaging unit 708. In some examples, inspection device 705 includes an entry zone (not shown) for sheet parts 704 to enter inspection device 705. In some examples, the entry zone of inspection device 705 automatically receives a sheet part from a collection of sheet parts 704. For example, the entry zone of inspection device 705 may include a portion of a moving belt that transports sheet parts 704 from manufacturing process 702, enabling sheet parts 704 to enter inspection device 705. In other examples, sheet parts 704 may be assembled in a stack after the sheet parts are created by manufacturing process 702, and individual sheet parts of the stack of sheet parts may automatically and continuously dispense onto the entry zone of inspection device 705. Additionally, or alternatively, inspection device 705 may include a selection member (not shown) configured to select an individual sheet part from the stack of sheet parts 704 and place the individual sheet part onto the entry zone of inspection device 705. In other examples, a device operator may manually place sheet parts 704 on the entry zone.

Imaging unit 708 may include one or more image capture devices 710. Image capture devices 710 may be cameras or other components configured to capture image data representative of sheet parts 704 within imaging unit 708. In other words, the image data captures a visual representation of an environment, such as sheet parts 704 within imaging unit 708. Image capture devices 710 may include components capable of capturing image data, such as a video recorder, an infrared camera, a CCD (Charge Coupled Device) array, or a laser scanner.

In some examples, image capture devices 710 can be conventional imaging devices that are capable of reading some or all of a moving sheet part and providing output in the form of a digital data stream. Image capture devices 710 may capture images corresponding to a sheet part of sheet parts 704. Image capture devices 710 may be cameras that directly provide a digital data stream or an analog camera with an additional analog to digital converter. Additionally, image capture devices 710 may include other sensors, such as, for example, laser scanners and linescan cameras.

In some examples, there can be one image capture device (e.g., image capture device 710A) that can be used to capture image data. In some examples, there can be multiple image capture devices (e.g., image capture devices 710A-710C) that each capture image data for a sheet part. In some aspects, the cameras may capture image data for a sheet part from different angles or different views. In such examples, imaging unit 708 or processing unit 720 can create composite image data from the image data of each of the image capture devices 710. As used herein, image data can include image data captured from a single image capture device and composite image data of a sheet part captured from multiple image capture devices.

After imaging unit 708 captures an image of a sheet part, inspection device 705 may output image data to processing unit 720. Processing unit 720 may be configured to assess a quality of the sheet part. For example, processing unit 720 can include a classifier 714 that utilizes an inspection model 716 to classify a sheet part according to the image data. Inspection model 716 may be a machine learning model, decision tree, or inspection recipe generated in whole or in part using the techniques described herein. Classifier 714 may apply inspection model 716 to the image data to determine if the image data indicates the sheet part 704 is defective and output classification data indicative of whether or not defects in the sheet part are detected in the image data. Processing unit 720 can output data that inspection device 705 can use to determine which of bins 712 is to be used to receive the sheet part. One of bins 712 may be used to hold sheet parts 704 classified as having a defect, while another of bins 712 may be used to hold sheet parts 704 that are not classified as having a defect.

In some examples, user interface 722 allows a user to control system 700. User interface 722 includes any combination of a display screen, a touchscreen, buttons, speaker inputs, or speaker outputs. In some examples, user interface 722 is configured to power on or power off any combination of the elements of system 700 and provide configuration information for processing unit 720.

In some examples, the output zone of inspection device 705 automatically routes a classified sheet part into a respective bin. Additionally, or alternatively, system 700 may indicate a classification of a sheet part and a device operator may manually sort the sheet part into a respective bin. In the examples in which the output zone automatically sorts sheet parts into respective bins 712, inspection device 705 may include a set of diverging tracks at the output zone, where each track of the diverging tracks leads to a bin of the plurality of bins 712.

Figure 8:
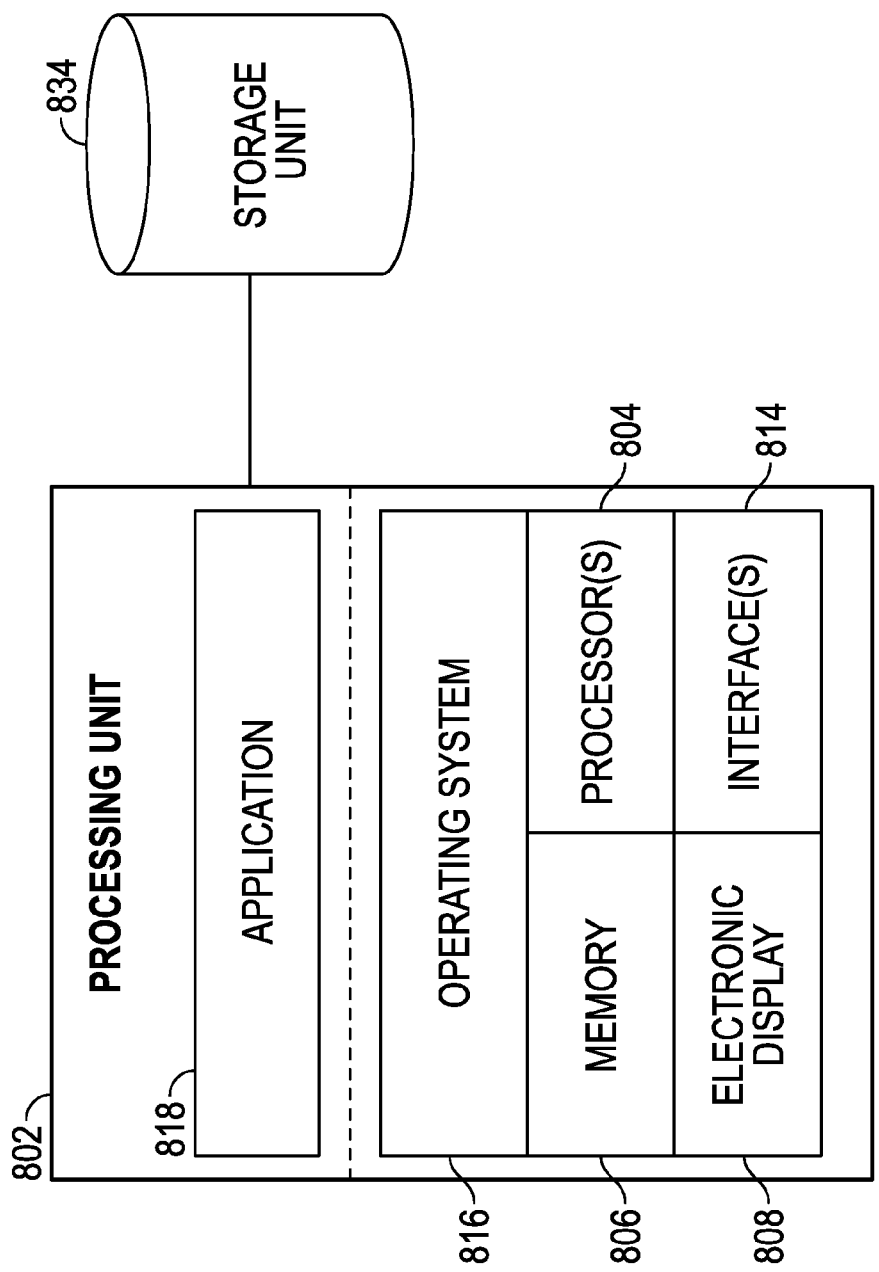
FIG. 8 is an illustration depicting an example processing unit 802 that operates in accordance with the techniques of the disclosure.

FIG. 8 is an illustration depicting an example processing unit 802 that operates in accordance with the techniques of the disclosure. The processing unit 802 provides a hardware environment for execution of application 818 that may be part of a workflow to labeled images and/or machine learning models for use in inspection systems according to the techniques described herein. For example, application 818 may be any of image gatherer 202, image selector 210, strategies 204, image labeler 214, model trainer 252, model analyzer 257 and/or processes/threads executable on active learning control server 304 by task service 314 as a task worker process 312. (FIGS. 2A, 2B, and 3).

In this example, processing unit includes processing circuitry that may include one or more processors 804 and memory 806 that, in some examples, provide a computer platform for executing an operating system 816, which may be a real-time multitasking operating system, for instance, or other type of operating system. In turn, operating system 816 provides a multitasking operating environment for executing one or more software components such as application 818. Processors 804 are coupled to one or more I/O interfaces 814, which provide I/O interfaces for communicating with devices such as a keyboard, controllers, display devices, image capture devices, other computing systems, and the like. Moreover, the one or more I/O interfaces 814 may include one or more wired or wireless network interface controllers (NICs) for communicating with a network. Additionally, processors 804 may be coupled to electronic display 808.

In some examples, processors 804 and memory 806 may be separate, discrete components. In other examples, memory 806 may be on-chip memory collocated with processors 804 within a single integrated circuit. There may be multiple instances of processing circuitry (e.g., multiple processors 804 and/or memory 806) within processing unit 802 to facilitate executing applications in parallel. The multiple instances may be of the same type, e.g., a multiprocessor system or a multicore processor. The multiple instances may be of different types, e.g., a multicore processor with associated multiple graphics processor units (GPUs). In some examples, processor 804 may be implemented as one or more microprocessors, digital signal processors (DSPs), application specific integrated circuits (ASICs), field-programmable gate array (FPGAs), or equivalent discrete or integrated logic circuitry, or a combination of any of the foregoing devices or circuitry.

The architecture of processing unit 802 illustrated in FIG. 8 is shown for example purposes only. Processing unit 802 should not be limited to the illustrated example architecture. In other examples, processing unit 802 may be configured in a variety of ways. Processing unit 802 may be implemented as any suitable computing system, (e.g., at least one server computer, workstation, mainframe, appliance, cloud computing system, and/or other computing system) that may be capable of performing operations and/or functions described in accordance with at least one aspect of the present disclosure. As examples, processing unit 802 can represent a cloud computing system, server computer, desktop computer, server farm, and/or server cluster (or portion thereof). In other examples, processing unit 802 may represent or be implemented through at least one virtualized compute instance (e.g., virtual machines or containers) of a data center, cloud computing system, server farm, and/or server cluster. In some examples, processing unit 802 includes at least one computing device, each computing device having a memory 806 and at least one processor 804.

Storage units 834 may be configured to store information within processing unit 802 during operation. Storage units 834 may include a computer-readable storage medium or computer-readable storage device. In some examples, storage units 834 include at least a short-term memory or a long-term memory. Storage units 834 may include, for example, random access memories (RAM), dynamic random access memories (DRAM), static random access memories (SRAM), magnetic discs, optical discs, flash memories, magnetic discs, optical discs, flash memories, or forms of electrically programmable memories (EPROM) or electrically erasable and programmable memories (EEPROM).

In some examples, storage units 834 are used to store program instructions for execution by processors 804. Storage units 834 may be used by software or applications 818 running on processing unit 802 to store information during program execution and to store results of program execution. For example, storage unit 834 may store some or all of image repository 206, controlled images 208, images of interest 212, and execution records 218 (FIGS. 2A and 2B). Further, storage units 834 may include training data storage 256, model storage 254 and/or data store 306 (FIG. 3). Storage unit 834 of processing unit 802 may also store configuration parameters, including hyperparameters, to control the operation of application 818 and other components of processing unit 802.

Figure 9D:
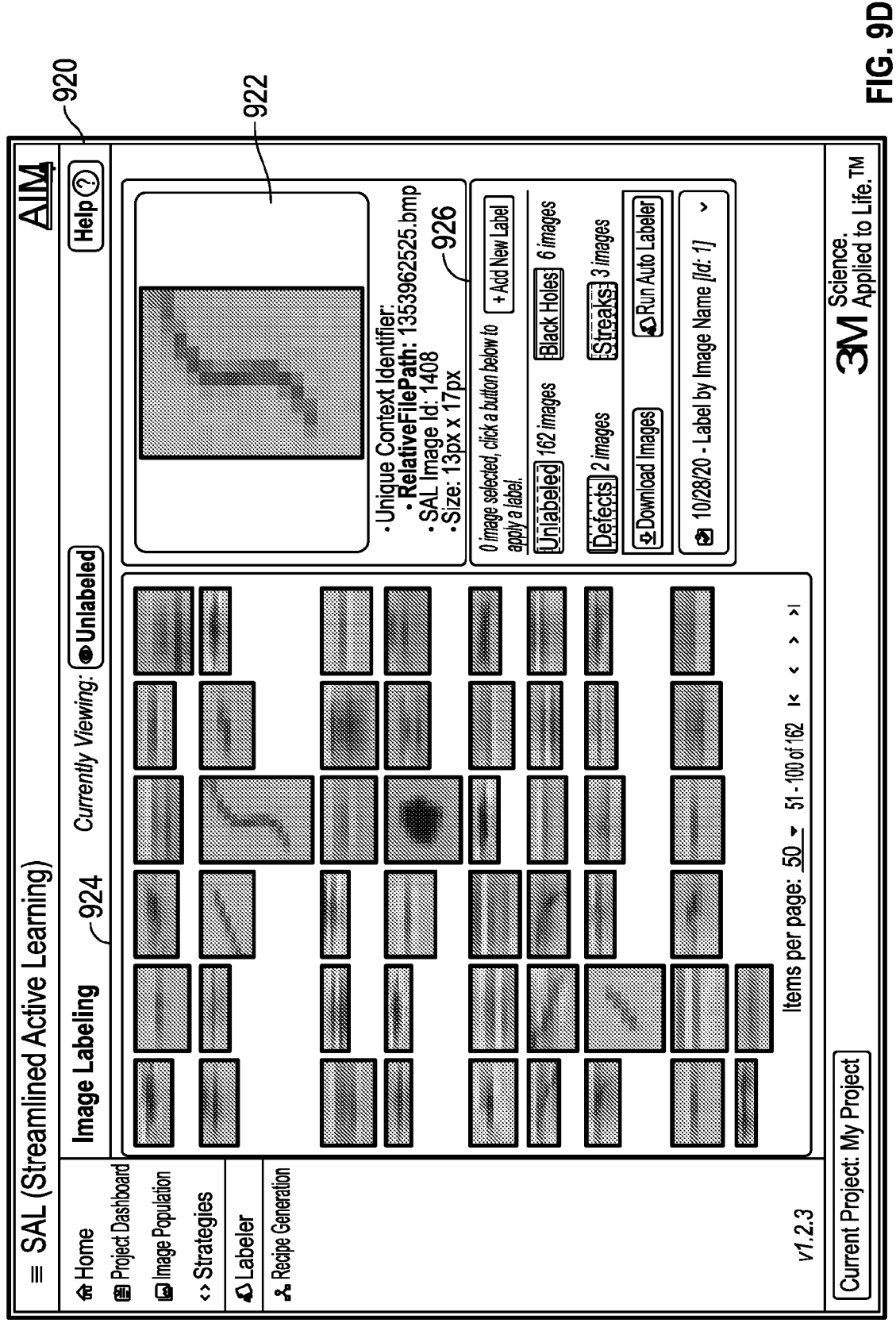

FIGS. 9A-9E are block diagrams illustrating various aspects of an example user interface for controlling active learning tasks and other tasks in accordance with at least one example technique described in this disclosure. FIG. 9A illustrates an example project screen 900 that provides a table 902 of existing projects and includes buttons or other user interface elements for creating new projects. In some aspects, each row of table 902 provides summary data for a project. As shown in table 902, such summary data can include a project name, project description, project creator, image population size, a lock indicator, and a button interface element to open the project. In some aspects, upon selection of a project row, further details may be provided about the project.

FIG. 9B illustrates an example controlled image population overview screen 904 for a project. Area 908 of screen 904 provides a population preview comprising thumbnail images corresponding to images currently associated with the project. Area 906 of screen 904 provides execution records for tasks that have been executed to add images to the image population for the project. Upon selection of an execution record, details regarding the task execution are presented, including the current progress of the task, input parameters such as image type and folder(s) where images may be found, and data regarding the results of the image population task.

FIG. 9C illustrates an example strategy screen 910 for a strategy. Area 912 of screen 910 provides execution records for image selection strategy tasks that have been executed to select images for addition to a set of images of interest for the project. A strategy record may include data such as the strategy ID, strategy name, status of the image selection task implementing the selection strategy, input parameters for the selection strategy, and results of executing the selection strategy (total number of images processed, number of images selected per the strategy etc.).

Area 914 of screen 910 provides execution records for image transformation tasks associated with strategies. Each execution record may include information such as when the transformation task was started, the type of transformation, number of images transformed etc.

FIG. 9D illustrates an example image labeling screen 920. Image labeling screen 920 provides an interface for applying labels to selected images. Area 924 shows thumbnail images of in a set of images of interest. In some aspects, the thumbnail images shown in area 924 may be filtered. For example, the set of images of interest may be filtered to include only unlabeled images. Area 922 of screen 920 shows a higher resolution (although not necessarily full resolution) of an image corresponding to a thumbnail image selected from the images in area 924. Area 926 shows labels that, upon selection, can be applied to one or more images that correspond to one or more currently selected thumbnail images, as well as a button that can be used to download the labeled images for further examination.

Figure 9E:
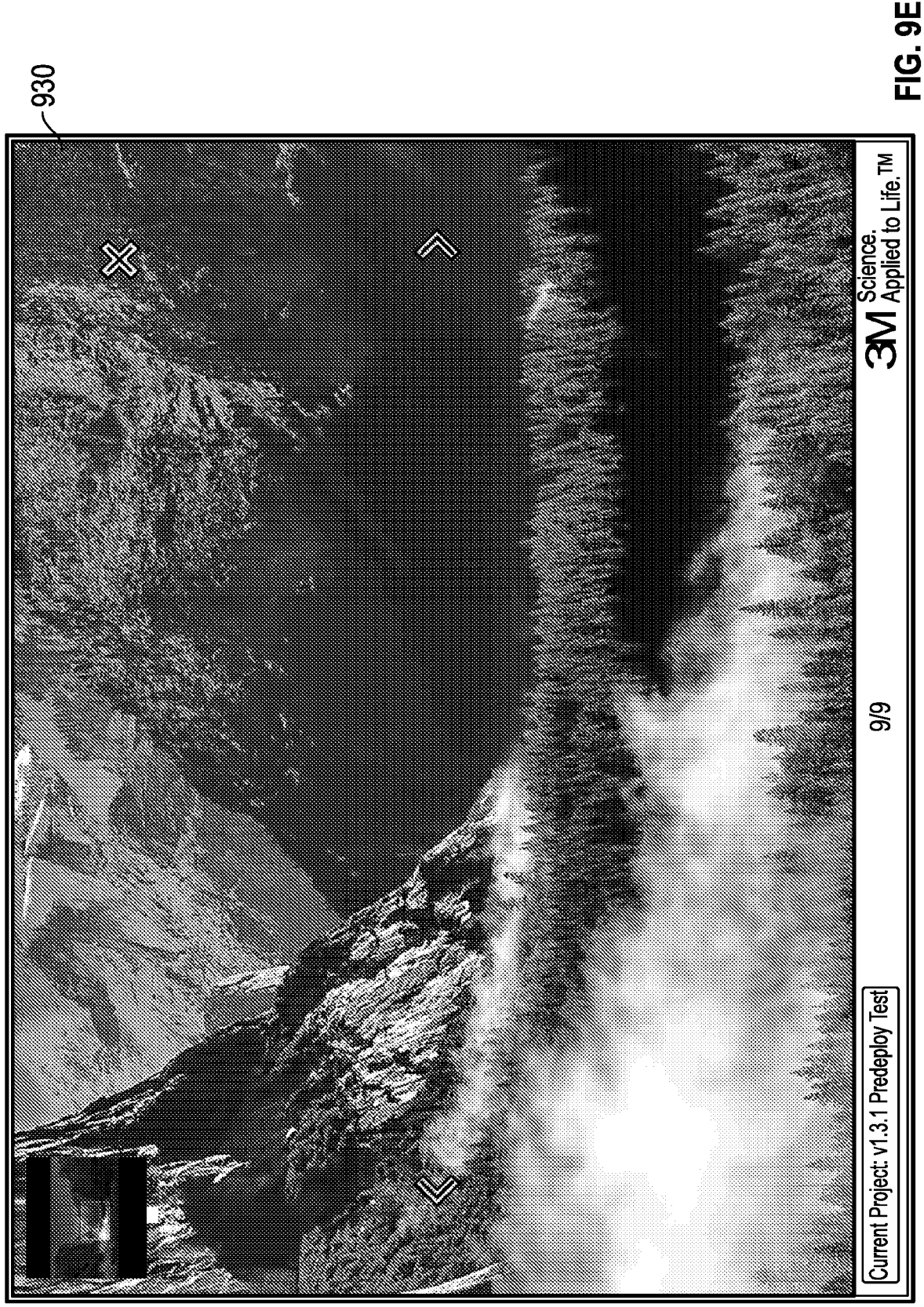

FIG. 9E illustrates an example full resolution image screen 930. In some cases, it may be necessary to view an image at full resolution in order to detect and label small defects in an image. An image may be selected from the thumbnail images shown in area 924 of screen 920. Image data for the selected image may be shown at full resolution on screen 930 thereby provide a better view of any small defects that may appear in the image so that the image may be labeled appropriately.

The techniques described in this disclosure may be implemented, at least in part, in hardware, software, firmware or any combination thereof. For example, various aspects of the described techniques may be implemented within at least one processor, including at least one microprocessor, DSP, ASIC, FPGA, and/or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform at least one of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with at least one module and/or unit may be performed by separate hardware or software components or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method (e.g., when the instructions are executed). Computer readable storage media may include RAM, read only memory (ROM), programmable read only memory (PROM), EPROM, EEPROM, flash memory, a hard disk, a CD-ROM, a floppy disk, a cassette, magnetic media, optical media, or other computer-readable storage media. The term "computer-readable storage media" refers to physical storage media, and not signals or carrier waves, although the term "computer-readable media" may include transient media such as signals, in addition to physical storage media.

What is claimed is:

1. A method for selecting product images for training a machine-learning model to inspect images of a product, the method comprising:
    obtaining, by an image gatherer of an active learning framework from an image repository, product images to include in an image population;
    receiving, by an image selector, an indication of an image selection strategy from a plurality of image selection strategies, each of the image selection strategies defining selection operations for determining if a product image is to be included in a set of images of interest;
    instantiating, by the image selector, a selection strategy task process corresponding to the image selection strategy, the selection strategy task process configured to perform the selection operations of the image selection strategy;
    determining, by the selection strategy task process, one or more image transforms from a plurality of image transforms based on configuration data for the indicated image selection strategy;
        in response to determining that one or more of the product images in the image population have not been previously transformed according to the one or more image transforms, instantiating one or more image transform task processes corresponding to the one or more image transforms, wherein the one or more image transform task processes are configured to perform image manipulation operations to obtain the transformed image data for each of the one or more of the product images in the image population;
    selecting, by the selection strategy task process, a subset of images from the image population for inclusion in the set of images of interest based on the selection operations for the indicated image selection strategy and the transformed image data;
    determining, by an image labeler, an indication of one or more descriptive labels and applying the one or more descriptive labels to the respective sets of images; and
    training an inspection model for a product inspection system based on the set of images of interest and corresponding labels of the set of images of interest.

2. The method of claim 1, further comprising:
    in response to determining that one or more of the plurality of product images in the image population have been previously transformed according to an image transform of the one or more image transforms, bypassing execution of the image transformation task process associated with the image transform for the one or more of the plurality of product images and retrieving the transformed image data from a storage location.

3. The method of claim 1, wherein the image selection strategy comprises a first image selection strategy, the subset of images comprises a first subset of images, and the selection strategy task process comprises a first selection strategy task process, wherein the method further comprises:
    receiving, by an image selector, an indication of a second image selection strategy from the plurality of image selection strategies, the second image selection strategy comprising second selection operations for determining if the product image is to be included in the set of images of interest;
    instantiating, by the image selector, a second selection strategy task process corresponding to the second image selection strategy; and
    selecting, by the second selection strategy task process, a second subset of images from the image population based on the second selection operations for the second image selection strategy and the transformed image data;
    wherein the set of images of interest includes the first subset of images and the second subset of images.

4. The method of claim 3, wherein the inspection model comprises a first inspection model, and wherein the method further comprises:
    determining a first performance metric for the first inspection model;
    determining a second performance metric for a second inspection model;
    comparing the first performance metric and the second performance metric; and
    providing an indication of whether to deploy the second inspection model to an inspection system for a production line based on the comparison.

5. The method of claim 1, further comprising:
    adding a second selection strategy to the plurality of image selection strategies, wherein a configuration for the second selection strategy includes a set of fixed properties, a set of user editable properties, and a list of image transformations associated with the second image selection strategy.

6. The method of claim 1, wherein determining the indication of the one or more descriptive labels to be applied to respective sets of images of the images of interest comprises one of:
    receiving the indication of the one or more descriptive labels from a user via a user interface; and
    automatically determining the one or more descriptive labels.

7. The method of claim 1, wherein obtaining, from the image repository, product images comprises obtaining the product images and zero or more associated metadata associated with the product images from an inspection system for a production line for the product.

8. The method of claim 7, wherein obtaining the product images from the inspection system comprises obtaining the product images based on scores assigned to the product images by an inspection model of the inspection system.

9. The method of claim 1, wherein selecting, by the selection strategy task process, the subset of images from the image population for inclusion in the set of images of interest comprises:
  receiving a number of images N that are to be selected from the image population; and
  generating one or more D-dimensional spheres (D-spheres) of radius R around each of one or more datapoints associated with labeled images, wherein R is determined according to a standard deviation of the data multiplied by D;
  iteratively performing, until N images are selected for the set of images of interest, operations comprising:
    generating an additional D-sphere of radius R around a datapoint associated with an unlabeled image;
    including images associated with datapoints from outside of the generated D-spheres in a candidate set of images; and
    selecting an image from the candidate set of images for inclusion in the set of images of interest.

10. The method of claim 9, further comprising:
  in response to determining that a number of the candidate images is less than a threshold percentage of images in the image population, reducing the radius R.

11. An active learning management system for selecting product images for training a machine-learning model to inspect images of a product, the active learning management system comprising:
  a memory; and
  processing circuitry configured to:
    obtain, from an image repository, product images to include in an image population;
    receive an indication of an image selection strategy from a plurality of image selection strategies, each of the image selection strategies defining selection operations for determining if a product image is to be included in a set of images of interest;
    instantiate a selection strategy task process corresponding to the image selection strategy, the selection strategy task process configured to perform the selection operations of the image selection strategy;
    determine, by the selection strategy task process, one or more image transforms from a plurality of image transforms based on configuration data for the indicated image selection strategy;
    in response to a determination that one or more of the product images in the image population have not been previously transformed according to the one or more image transforms, instantiate one or more image transform task processes corresponding to the one or more image transforms, wherein the one or more image transform task processes are configured to perform image manipulation operations to obtain the transformed image data for each of the one or more of the product images in the image population;
    select, by the selection strategy task process, a subset of images from the image population for inclusion in the set of images of interest based on the selection operations for the indicated image selection strategy and the transformed image data;
    determine an indication of one or more descriptive labels and apply the one or more descriptive labels to the respective sets of images; and
    train an inspection model for a product inspection system based on the set of images of interest and corresponding labels of the set of images of interest.

12. The active learning management system of claim 11, wherein the processing circuitry is further configured to:
  in response to a determination that one or more of the plurality of product images in the image population have been previously transformed according to an image transform of the one or more image transforms, bypass execution of the image transformation task process associated with the image transform for the one or more of the plurality of product images and retrieve the transformed image data from a storage location.

13. The active learning management system of claim 11, wherein the image selection strategy comprises a first image selection strategy, the subset of images comprises a first subset of images, and the selection strategy task process comprises a first selection strategy task process, wherein the processing circuitry is further configured to:
  receive an indication of a second image selection strategy from the plurality of image selection strategies, the second image selection strategy comprising second selection operations for determining if the product image is to be included in the set of images of interest;
  instantiate a second selection strategy task process corresponding to the second image selection strategy; and
  select, by the second selection strategy task process, a second subset of images from the image population based on second selection operations and the transformed image data;
  wherein the set of images of interest includes the first subset of images and the second subset of images.

14. The active learning management system of claim 13, wherein the inspection model comprises a first inspection model, and wherein the processing circuitry is further configured to:
  determine a first performance metric for the first inspection model;
  determine a second performance metric for a second inspection model;
  compare the first performance metric and the second performance metric; and
  provide an indication of whether to deploy the second inspection model to an inspection system for a production line based on the comparison.

15. The active learning management system of claim 11, wherein the processing circuitry is further configured to:
  add a second selection strategy to the plurality of image selection strategies, wherein a configuration for the second selection strategy includes a set of fixed properties, a set of user editable properties, and a list of image transformations associated with the second image selection strategy.

16. The active learning management system of claim 11, wherein to determine the indication of the one or more descriptive labels to be applied to respective sets of images of the images of interest comprises one of:
  receive the indication of the one or more descriptive labels from a user via a user interface; and
  automatically determine the one or more descriptive labels.

17. The active learning management system of claim 11, wherein to obtain, from the image repository, product images comprises to obtain the product images and zero or more associated metadata associated with the product images from an inspection system for a production line for the product.

18. The active learning management system of claim 11, wherein to select, by the selection strategy task process, the subset of images from the image population for inclusion in the set of images of interest comprises:
- receive a number of images N that are to be selected from the image population; and
- generate one or more D-dimensional spheres (D-spheres) of radius R around each of one or more datapoints associated with labeled images, wherein R is determined according to a standard deviation of the data multiplied by D;
- iteratively perform, until N images are selected for the set of images of interest, operations comprising:
- generate an additional D-sphere of radius R around a datapoint associated with an unlabeled image;
- include images associated with datapoints from outside of the generated D-spheres in a candidate set of images; and
- select an image from the candidate set of images for inclusion in the set of images of interest.

19. The active learning management system of claim 18, wherein the processing circuitry is further configured to:
- in response to a determination that a number of the candidate images is less than a threshold percentage of images in the image population, reduce the radius R.

* * * * *